United States Patent [19]

Takahashi

[11] Patent Number: 5,430,639
[45] Date of Patent: Jul. 4, 1995

[54] POLYPHASE AC INPUT TO DC OUTPUT VOLTAGE CONVERTER

[75] Inventor: Fumikazu Takahashi, Tochigi, Japan

[73] Assignee: Kabushiki Kaisha Toshiba, Kanagawa, Japan

[21] Appl. No.: 201,229

[22] Filed: Feb. 24, 1994

[30] Foreign Application Priority Data

Feb. 26, 1993 [JP] Japan .................. 5-037770

[51] Int. Cl.⁶ ............................................. H02M 7/00
[52] U.S. Cl. .................................................... 363/124
[58] Field of Search ...................... 363/34, 78, 82, 84, 363/87, 90, 124

[56] References Cited

U.S. PATENT DOCUMENTS 3,823,360  7/1974  Grandin de l'Eprevier .......... 363/84
3,953,783  4/1976  Peters, Jr. ............................ 363/124

OTHER PUBLICATIONS

[Untranslated Japanese article] "Denshi Gijutsu," Mar. 1990 (special enlarged issue, pp. 90-99.
R. Saito, Y. Suzuki & K. Seo, "Polyphase Rectifier With Constant-Energy Modulation Technique," *Proceeding of Intelec*, 1982 IEEE, pp. 321-326.

Primary Examiner—Steven L. Stephan
Assistant Examiner—E. To
Attorney, Agent, or Firm—Limbach & Limbach

[57] ABSTRACT

A polyphase input DC power source apparatus for converting an AC power from a polyphase AC power source formed of star-connected secondary windings into a DC power of both positive and negative outputs includes a polyphase chopper circuit connected to each phase of the polyphase AC power source and formed of a reactor excited upon application of a voltage and a switching element for chopping a current flowing in the reactor, a polyphase rectifying circuit for rectifying an output from the polyphase chopper circuit, a capacitor, connected in parallel to a load, for accumulating an output from the polyphase rectifying circuit, connected in parallel to a load, and a controller for monitoring a voltage and current of the AC power source and a voltage applied to the load to control the switching element such that a current flowing in each phase of the polyphase AC power source is proportional to a voltage of each phase.

19 Claims, 23 Drawing Sheets

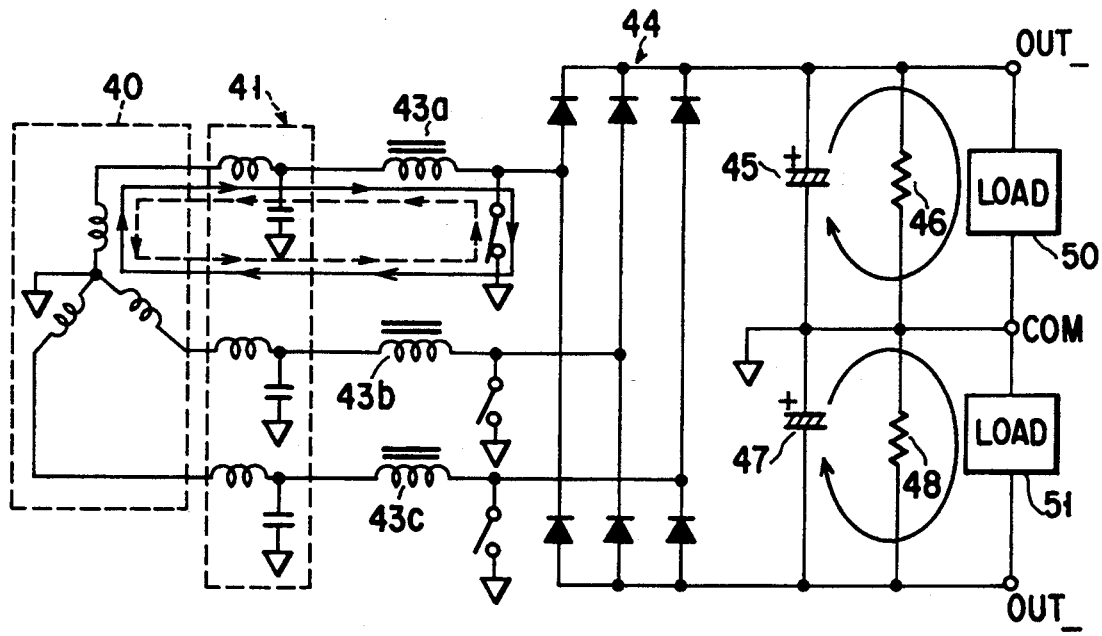
F I G. 14
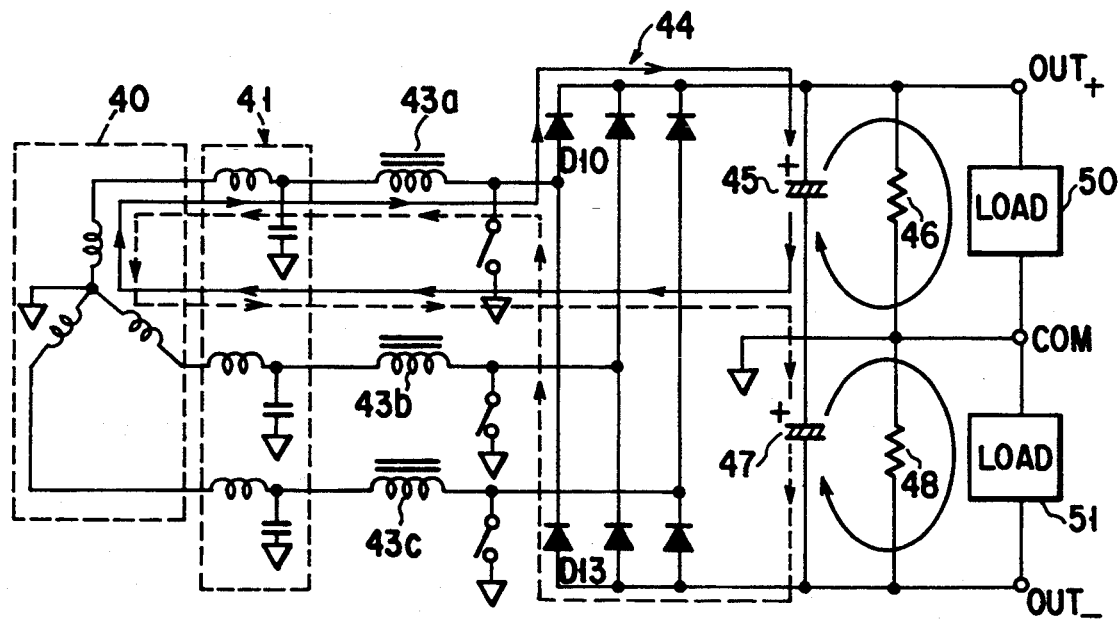
F I G. 15

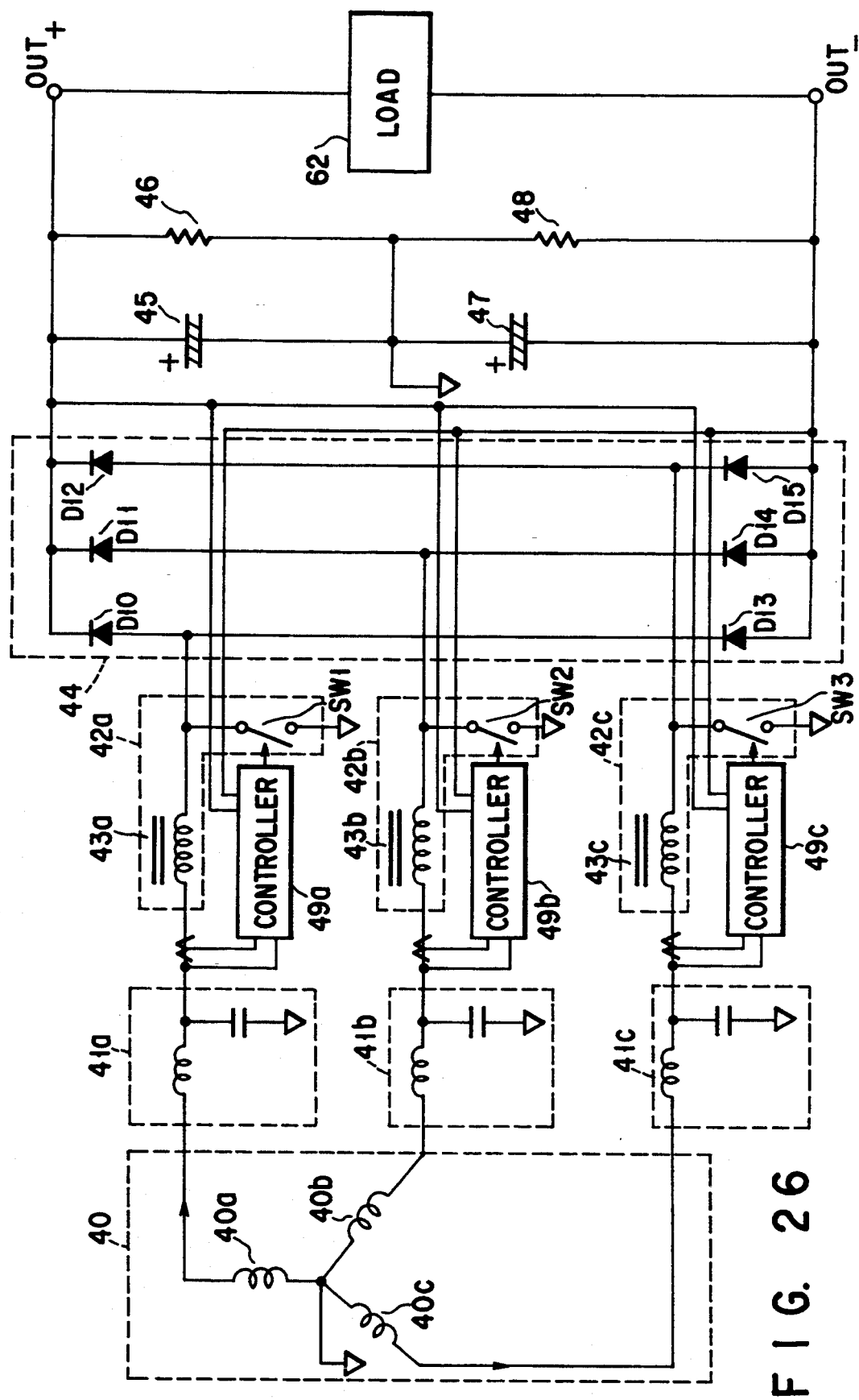
F I G. 26

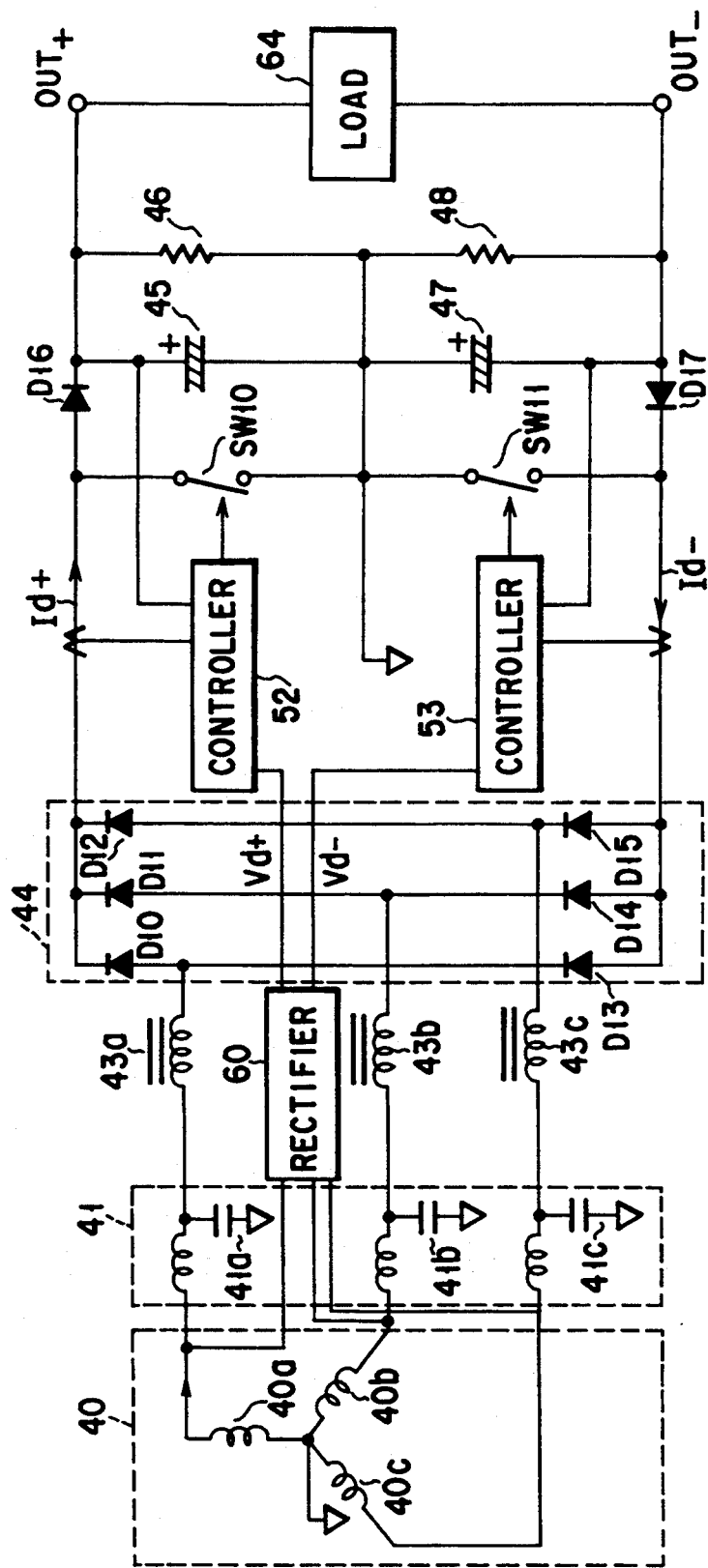
F I G. 27

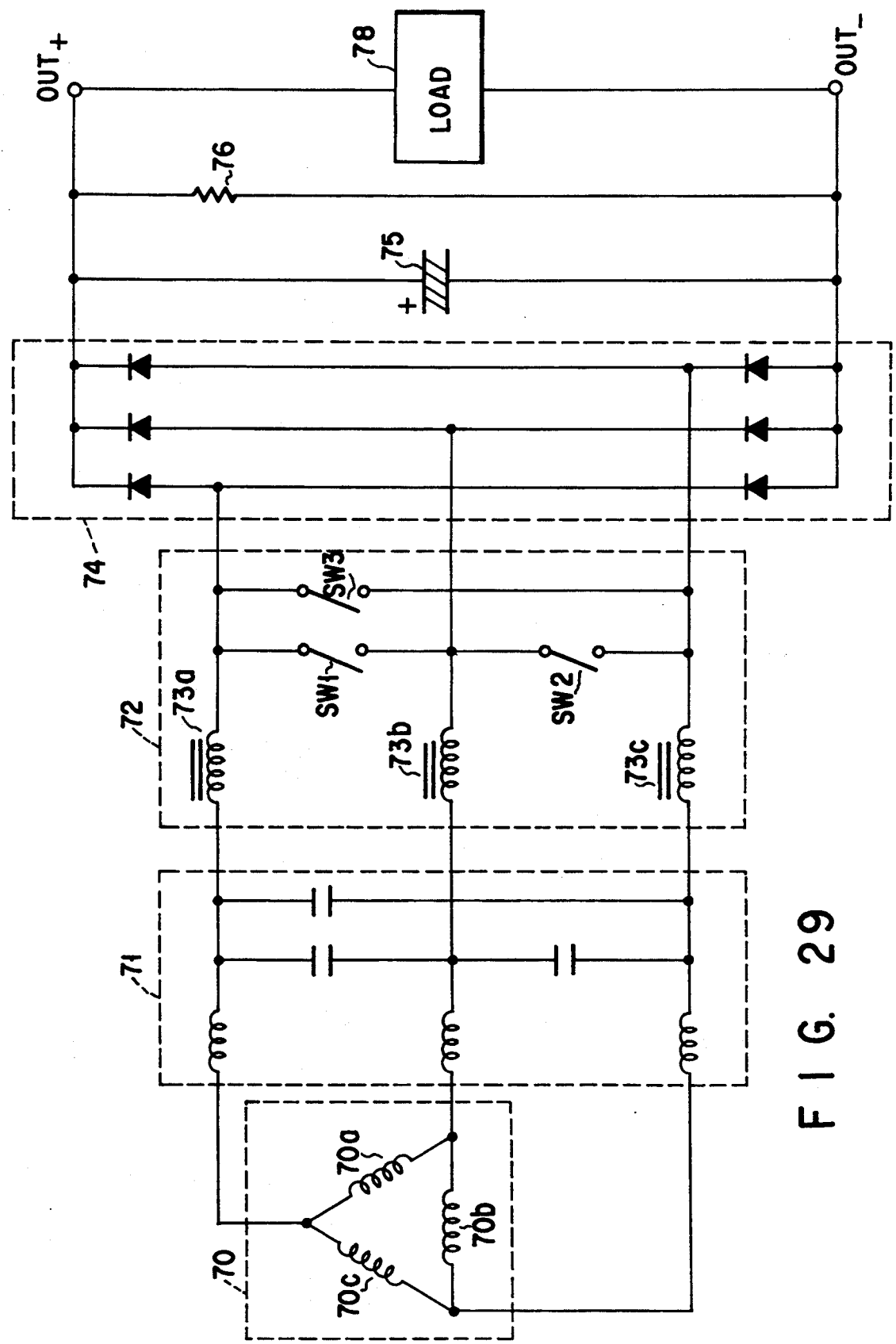
F I G. 29

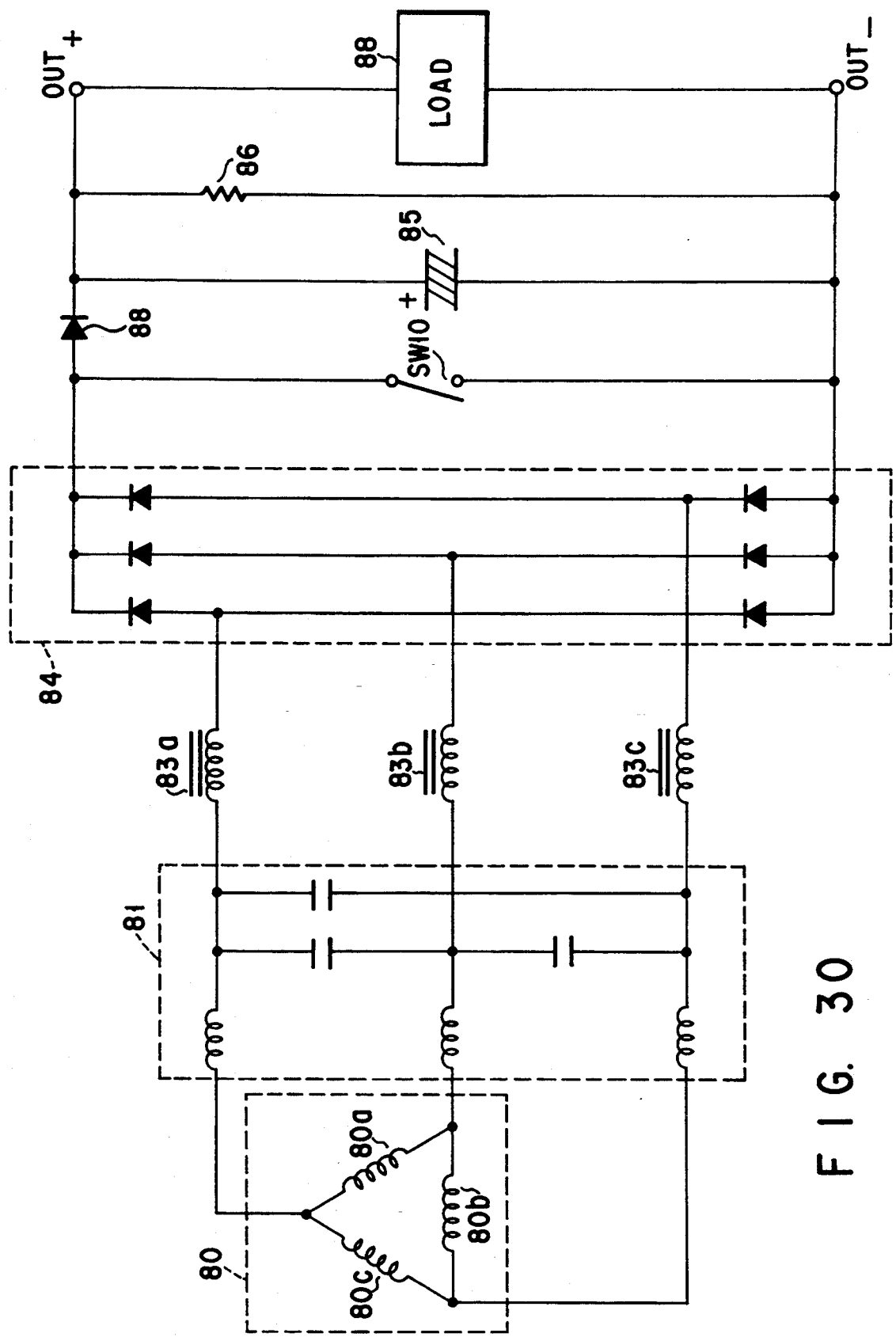
F I G. 30

POLYPHASE AC INPUT TO DC OUTPUT VOLTAGE CONVERTER

BACKGROUND OF THE INVENTION

1. Field of the Invention

The present invention relates to a DC power source apparatus used for an electronic or electrical equipment and, more particularly, to a polyphase input DC power source apparatus applied to a medical equipment such as an x-ray CT or MRI apparatus and connected to a polyphase AC power source to improve an input power factor.

2. Description of the Related Art

FIG. 1 is a block diagram showing the arrangement of a capacitor-input DC power source apparatus. A single-phase AC power source 1 is connected to a single-phase rectifying circuit 2 formed of bridge-connected diodes D1 to D4. A capacitor 3 is connected between the output terminals of the rectifying circuit 2. A load 4 is connected to the two terminals of the capacitor 3. The power source 1 is connected to the rectifying circuit 2 through impedances zp.

In the power source circuit shown in FIG. 1, assume that an input voltage to the rectifying circuit 2 is Vin, an input current is Iin, an input rectified voltage is Vd, an input rectified current is Id, and a terminal voltage of the capacitor 3 (output voltage from the rectifying circuit 2) is Vc. Only when the input rectified voltage Vd is higher than the terminal voltage Vc of the capacitor 3, the input current Iin having a pulse waveform flows, as shown in FIG. 2.

Because of this pulse-like input current Iin, the power factor of this power source circuit is as low as 0.5 to 0.6. The peak value of the pulse-like input current is relatively large. For this reason, a distribution equipment including the AC power source 1 need to have a power capacity much larger than the actual power consumption. The impedances Zp connected between the AC power source 1 and the rectifying circuit 2 temporarily cause a large voltage drop when the large input current Iin flows, resulting in distortion of the waveform of the input voltage Vin. Referring to FIG. 2, a broken line represents an input voltage waveform without distortion, and a solid line represents a distorted voltage waveform.

In addition, the Fourier-transformed pulse-like input current Iin includes a lot of harmonic components, as shown in FIG. 3.

Such distortion of the input voltage waveform or harmonic components of the input current affects, as a noise source, other electrical equipments connected to the AC power source 1.

In order to prevent distortion of the voltage waveform and decrease the harmonic components of the input current (i.e., improve the power factor), as shown in FIG. 4, it is known that the waveform of the input current Iin is effectively controlled in proportion to the waveform of the input voltage Vin. As a result, as shown in FIG. 5, it is known that the harmonic components are eliminated from the waveform of the Fourier-transformed input current Iin to effectively obtain only fundamental wave components.

Such a DC power source apparatus which controls the input current waveform to improve the power factor, decrease harmonic components, and prevent distortion of a voltage waveform is described in "DENSHI GIJUTSU" March 1990 (special enlarged issue), pp. 90–99 as an active smoothing filter control IC (150-w step-up DC/DC converter). FIG. 6 is a block diagram showing the arrangement of this DC power source apparatus. As in the conventional apparatus in FIG. 1, a rectifying circuit 2 is connected to a single-phase AC power source 1. A step-up chopper circuit 5 formed of a choke coil 6 and a switching element 7 is connected between the output terminals of the rectifying circuit 2. The connection point between the choke coil 6 and the switching element 7 is connected to the anode of a diode D5. The cathode of the diode D5 is connected to one terminal of a capacitor 3. The other terminal of the capacitor 3 is connected to the other terminal of the switching element 7 (one terminal thereof is connected to the choke coil 6). A load 4 is connected to the two terminals of the capacitor 3.

A controller 8 is connected to the chopper circuit 5. The controller 8 monitors an input rectified voltage Vin, an output voltage Vout, and an input rectified current Id detected by a current sensor 9 to ON/OFF-control the switching element 7 on the basis of these monitored values.

FIG. 7 is a graph showing the relationship between the ON/OFF operation of the switching element 7 of the DC power source apparatus, the input rectified voltage Vd, and the input rectified current Id.

At time t=0, Vd is lower than Vout, so that no input rectified current Id flows if the switching element 7 is off. When the controller 8 turns the switching element 7 on, the current flows in the choke coil 6. At this time, the input rectified current Id flows through a path indicated by a solid line or a broken line in FIG. 8.

When the switching element 7 is turned off at time t=t1, the energy accumulated in the choke coil 6 is discharged and transferred to the capacitor 3 through the diode D5. At this time, the input rectified current Id decreases, as shown in FIG. 7. A path through which the input rectified current Id flows is indicated by a solid line or a broken line in FIG. 9.

when the switching element 7 is turned on again at time t=t2, the current flows in the choke coil 6 as at time t=0, as shown in FIG. 8, and the energy is accumulated. At this time, the input rectified current Id increases, as shown in FIG. 7.

When the switching element 7 is then turned off, the energy accumulated in the choke coil 6 is discharged as at time t=t1, as shown in FIG. 9, and transferred to the capacitor 3 through the diode D5.

As described above, the switching element 7 is repeatedly turned on/off to cause the input rectified current Id and input current Iin to constantly flow. The magnitude or waveform of the input rectified current Id and input current Iin can be controlled by controlling the ON/OFF time ratio of the switching element 7.

Therefore, when the controller 8 monitors the input rectified voltage Vd, the output voltage Vout, and the input rectified current Id to control the switching element 7 such that the input rectified current Id is proportional to the input rectified voltage Vd, a high power factor can be obtained.

As the controller 8 for performing such switching control, for example, an ML4821 (tradename) is commercially available from Microlinear.

For a low-power equipment, a single-phase AC input scheme is used for a DC power source. However, in an application to a high-power equipment, it is frequently to use a three-phase AC power source instead of the single-phase AC power source 1, and convert a three-phase AC voltage into a DC voltage.

Such a three-phase AC-DC power source is described in "Polyphase Rectifier with Constant-Energy Modulation Technique", Ryoji Saito, Yoshio Suzuki, and Kazuhiro Seo, Proceeding of INTELEC 82, pp. 321-326, in which three single-phase input DC power source apparatuses are connected in parallel. A three-phase AC-DC power source circuit in which three single-phase input power source circuits shown in FIG. 6 are connected in parallel on the basis of the above concept is shown in FIG. 10.

Secondary coils 11a to 11c, each corresponding to one phase of a three-phase transformer 11, are connected to rectifying circuits 12a to 12c formed of bridge-connected diodes, respectively.

Step-up chopper circuits 15a to 15c formed of choke coils 16a to 16c and switching elements 17a to 17c are connected between the output terminals of the rectifying circuits 12a to 12c. The connection points between the choke coils 16a to 16c and the switching elements 17a to 17c are commonly connected to a capacitor 13 through diodes D5a to D5c. A load 14 is connected in parallel to the capacitor 13.

Controllers 18a to 18c for controlling the switching elements 17a to 17c monitor an input rectified voltage Vd, an output voltage rout, and an input rectified current Id to ON/OFF-control the switching elements 17a to 17c, respectively, on the basis of these monitored values such that the waveform of the input rectified current Id is proportional to that of the input rectified voltage Vd.

The above power source apparatuses are related to an apparatus for obtaining an output voltage of a single polarity. However, a standard electrical equipment frequently requires both positive and negative outputs as DC outputs. Therefore, a DC power source apparatus as shown in FIG. 11 is considered to obtain both positive and negative outputs by using the arrangement in FIG. 10.

Secondary coils 21a to 21c of a three-phase transformer 21 are connected to rectifying circuits 22a to 22c through low-pass filters 20a to 20c, respectively.

Of the positive and negative output terminals of the rectifying circuits 22a to 22c, the positive output terminals are connected to step-up chopper circuits 25a to 25c formed of choke coils 26a to 26c and switching elements 27a to 27c, respectively. The negative output terminals are connected to step-up chopper circuits 25d to 25f formed of choke coils 25d to 26f and switching elements 27d to 27f, respectively.

The output terminals of the step-up chopper circuits 25a to 25c on the positive side are commonly connected to a capacitor 23a through diodes D25a to D25c. The output terminals of the step-up chopper circuits 25d to 25f on the negative side are commonly connected to a capacitor 23b through diodes D25d to D25f.

A common line (COM) is connected to the intermediate taps of the secondary coils 21a to 21c of the three-phase transformer 21. The common line (COM) is connected to one terminal of each of the switching elements of the step-up chopper circuits 25a to 25f (the other terminal is connected to a corresponding one of the connection points with the choke coils).

The switching elements is ON/OFF-controlled on the basis of monitored values of an input rectified voltage Vd, an output voltage Vout, and an input rectified current Id by controllers 18a to 18f, respectively.

However, in the three-phase power source for obtaining both positive and negative outputs as described above, the number of components such that the step-up chopper circuits 25a to 25f formed of the choke coils 26a to 26f and the switching elements 27a to 27f, or the diodes D25a to D25f are required. In addition, the controller 18a to 18f are required to ON/OFF-control the switching elements 27a to 27f to complicate the circuit arrangement. Further, the cost is increased in accordance with an increase in number of components such as choke coils, switching elements, diodes, and controllers.

As described above, when a DC power source apparatus for obtaining both positive and negative outputs and improving the power factor is applied to a three-phase power source, the number of components such as choke coils constituting step-up circuits is increased, and at the same time, the number of controllers is increased, resulting in a complicated and expensive circuit arrangement.

SUMMARY OF THE INVENTION

Accordingly, it is an object of the present invention to provide a polyphase input DC power source apparatus which can decrease the number of components even in an application to a polyphase power source, thereby simplifying the circuit arrangement and reducing the cost.

According to the present invention, there is provided a polyphase input DC power source apparatus, comprising:

a polyphase chopper connected to each phase of a polyphase AC power source and formed of a reactor excited upon application of a voltage and a switching element for chopping a current flowing in the reactor;

a polyphase rectifying circuit for rectifying an output from the chopper; and means for ON/OFF-controlling the switching element such that a current flowing in each phase of the polyphase power source is proportional to a voltage of each phase.

According to the present invention, there is also provided a polyphase input DC power source apparatus, comprising:

a plurality of reactors each connected to a corresponding phase of a polyphase AC power source and excited upon application of a voltage;

a polyphase rectifying circuit for rectifying outputs from the plurality of reactors;

a switching element, constituting a chopper together with the plurality of rectors, for chopping an output current from the polyphase rectifying circuit; and means for ON/OFF-controlling the switching element such that a current flowing in each phase of the polyphase power source is proportional to a voltage of each phase.

According to the present invention, there is further provided a polyphase input DC power source apparatus, comprising:

a polyphase rectifying circuit for rectifying an output from a polyphase AC power source, a chopper connected to an output of the polyphase rectifying circuit and formed of a reactor excited upon application of a voltage and a switching element for chopping a current flowing in the reactor; and means for ON/OFF-controlling the switching element such that a current flowing in each phase of the polyphase AC power source is proportional to a voltage of each phase.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 14 is a block diagram showing an operation in an ON state of a switching element of the step-up chopper circuit in the first embodiment;

FIG. 15 is a block diagram showing an operation in an OFF state of the switching element of the step-up chopper circuit in the first embodiment;

FIG. 26 is a block diagram showing the arrangement of a polyphase input DC power source apparatus according to a fourth embodiment of the present invention;

FIG. 27 is a block diagram showing the arrangement of a polyphase input DC power source apparatus according to a fifth embodiment of the present invention;

FIG. 29 is a block diagram showing the arrangement of a polyphase input DC power source apparatus according to a seventh embodiment of the present invention;

FIG. 30 is a block diagram showing the arrangement of a polyphase input DC power source apparatus according to an eighth embodiment of the present invention;

DETAILED DESCRIPTION OF THE PREFERRED EMBODIMENTS

Figure 12:
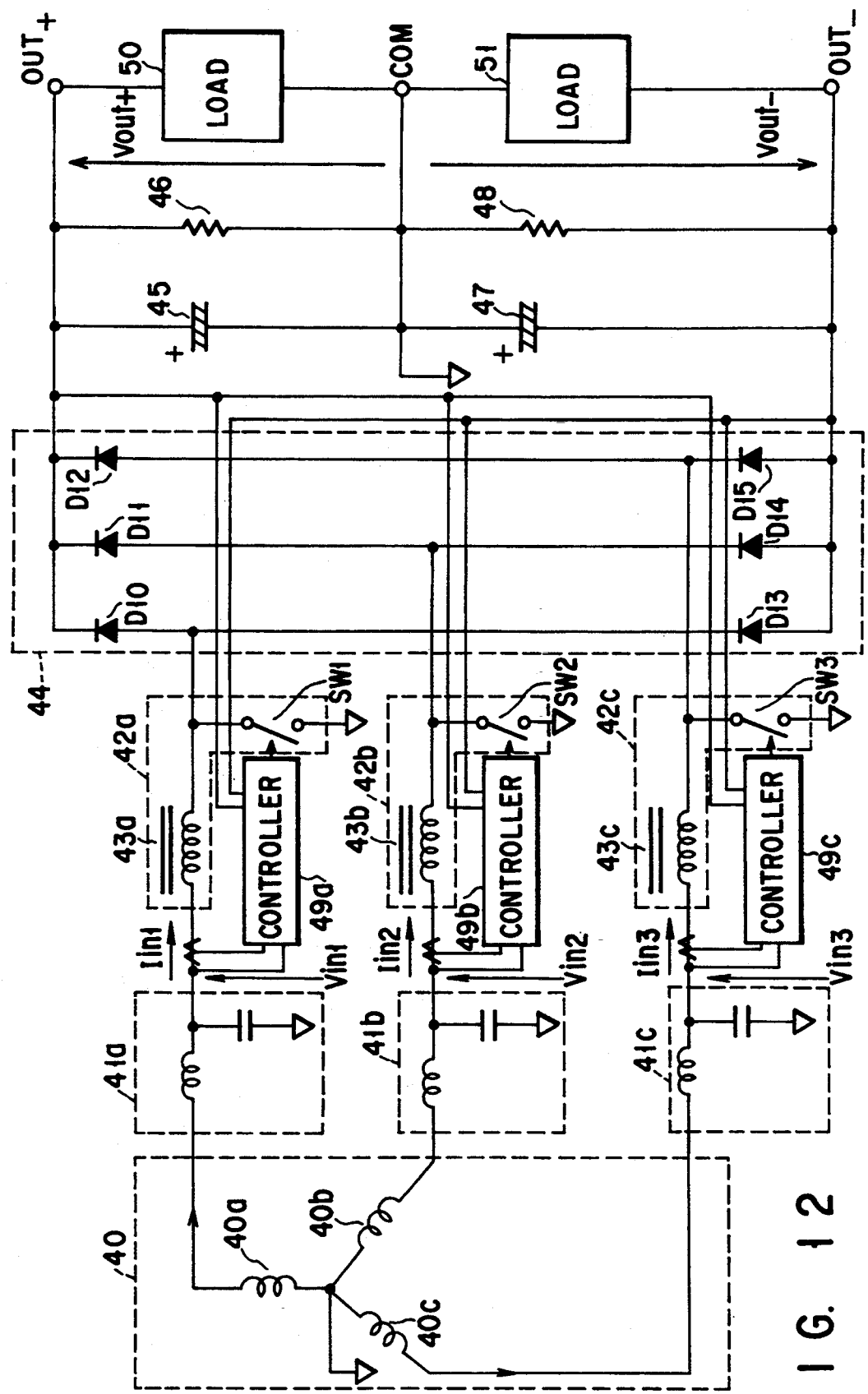
FIG. 12 is a block diagram showing the arrangement of a polyphase input DC power source apparatus according to a first embodiment of the present invention.

A preferred embodiment of a polyphase input DC power source apparatus according to the present invention will now be described with reference to the accompanying drawings. FIG. 12 is a block diagram showing the arrangement of a polyphase input DC power source apparatus according to the first embodiment, which is applied to a three-phase input and a positive/negative output.

Secondary coils 40a to 40c, each corresponding to one phase of a three-phase transformer 40, are connected to low-pass filters 41a to 41c formed of coils and capacitors, respectively. The low-pass filters 41a to 41c are arranged to smooth the waveform of a current. The three-phase AC power source has phases "A", "B", and "C". The secondary coils 40a to 40c are arranged for the corresponding phases and star-connected to each other.

Each output of the low-pass filters 41a to 41c is connected to one terminal of each of choke coils 43a to 43c. The other terminal of each of the choke coils 43a to 43c is connected to one terminal of a corresponding one of bidirectional switches SW1 to SW3. The other terminal of each of the bidirectional switches SW1 to SW3 is connected to the neutral point of the three-phase AC power source. The choke coils 43a to 43c and the bidirectional switches SW1 to SW3 constitute step-up chopper circuits 42a to 42c, respectively.

The output terminals (connection points between the choke coils 43a to 43c and the bidirectional switches SW1 to SW3) of the step-up chopper circuits 42a to 42c are connected to a three-phase full-wave rectifying circuit 44. The three-phase rectifying circuit 44 is formed of six bridge-connected diodes D10 to D15. The cathodes of the diodes D10 to D12 are commonly connected to a positive output terminal OUT+. The cathodes of the diodes D13 to D15 are commonly connected to a negative output terminal OUT−.

The positive output terminal OUT+ of the three-phase rectifying circuit 44 is connected to one terminal of a capacitor 45 and one terminal of a resistor 46. The negative output terminal OUT− is connected to one terminal of a capacitor 47 and one terminal of a resistor 48. The other terminal of each of the capacitors 45 and 47 and the other terminal of each of the resistors 46 and 48 are connected to the neutral point (COM) of the three-phase AC power source. Loads 50 and 51 are connected between the positive output terminal OUT+ and the neutral point COM and between the negative output terminal OUT− and the neutral point COM, respectively.

Controllers 49a to 49c are connected to the step-up chopper circuits 42a to 42c, respectively. The controllers 49a to 49c respectively produce monitored rectified input voltages Vd1 to Vd3 and monitored rectified input currents Id1 to Id3 based on the input voltage Vin1 to Vin3 and input currents Iin1 to Iin3, and monitor a positive output voltage Vout+ and a negative output voltage Vout− to ON/OFF-control the bidirectional switches SW1 to SW3, as shown in FIG. 13, such that the waveforms of the input currents Iin1 to Iin3 are proportional to the waveforms of the input voltages Vd1 to Vd3, respectively.

An operation of the first embodiment having the above arrangement will be described below. The A-, B-, and C-phase voltages of the three-phase AC power source are phase-shifted from each other by 120°. Therefore, the controllers 49a to 49c are operated at shifted timings according to the phase difference of 120°. The input current actually flowing in this power source apparatus is obtained by superposing the input currents flowing in accordance with the operations of these phases.

For example, the operation of the phase "A" of the three-phase AC power source will be described below in accordance with the timing chart shown in FIG. 13A.

At time t=0, the controller 49a turns the bidirectional switch SW1 on to cause the current to flow in the choke coil 43a to accumulate the energy. At this time, the current flows through a path indicated by a solid line or a broken line in FIG. 14.

At time t=t1, when the bidirectional switch SW1 is turned off, the energy accumulated in the choke coil 43a is discharged and transferred to the capacitors 45 and 47 through the diode D10 or D13. At this time, the input current Iin1 decreases, as shown in FIG. 13A. A path through which the input current flows is indicated by a solid line or a broken line in FIG. 15.

Figure 13A:
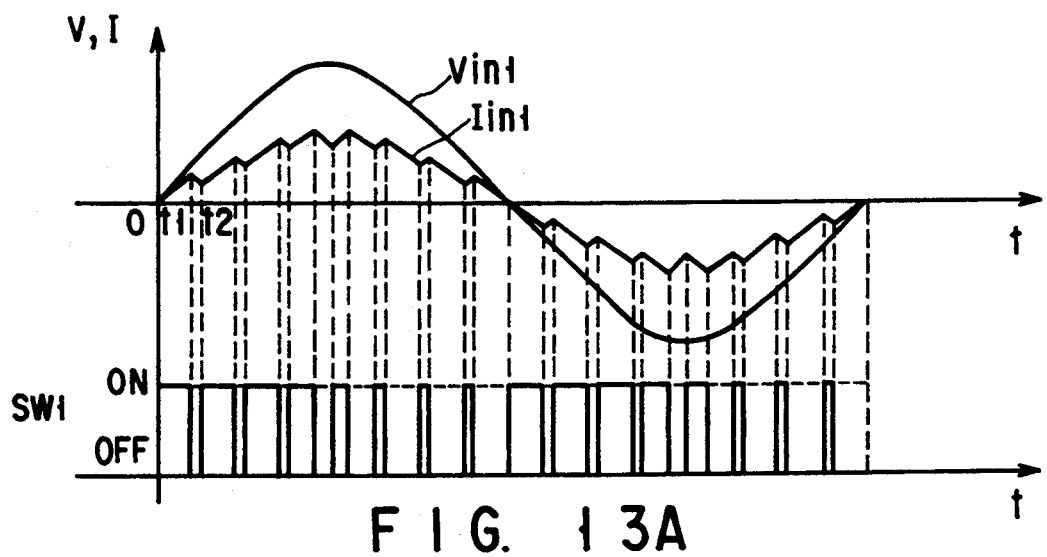
FIGS. 13A to 13C are timing charts showing chopping timings in step-up circuits in the first embodiment.

At time t=t2, when the bidirectional switch SW1 is turned on again, the current flows in the choke coil 43a as in the case of FIG. 14, the energy is accumulated, and the input current Iin1 increases, as shown in FIG. 13A. When the bidirectional switch SW1 is then turned off, the energy accumulated in the choke coil 43a is discharged as in the case of FIG. 15 and transferred to the capacitors 45 and 47 through the diode D10 or D13. At this time, the input current Iin1 decreases, as shown in FIG. 13A. The path through which the input current flows is indicated by the solid line or the broken line in FIG. 15.

As described above, the path of the input current changes in accordance with an ON/OFF operation of the switch SW1, and the choke coil is repeatedly charged/discharged, so that the input current flows in proportion to the input voltage.

Figure 32:
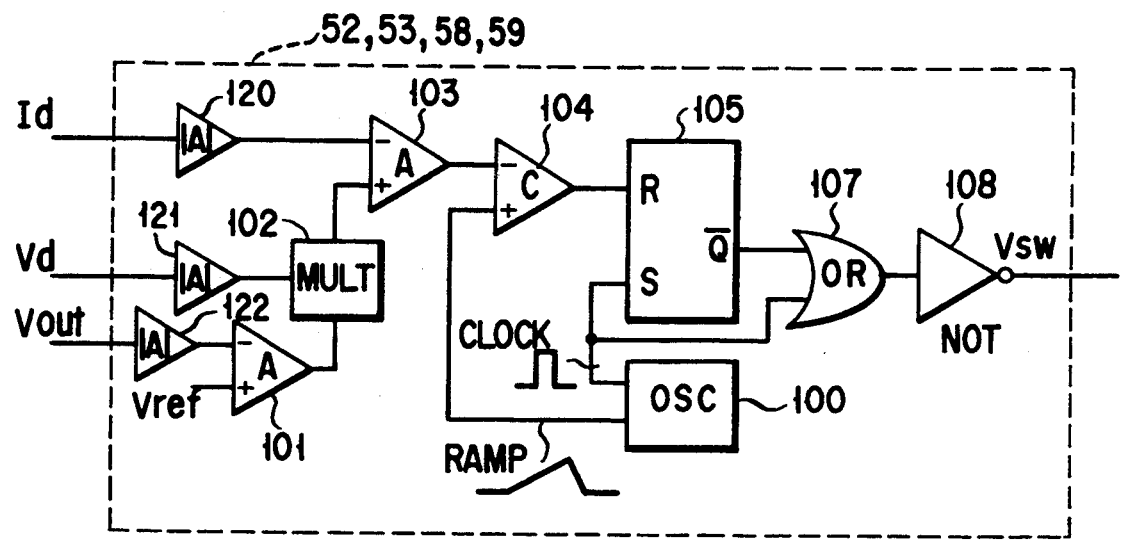
FIG. 32 is a block diagram showing the arrangement of an example of a controller for ON/OFF-controlling switching elements of a chopper.
Figure 33:
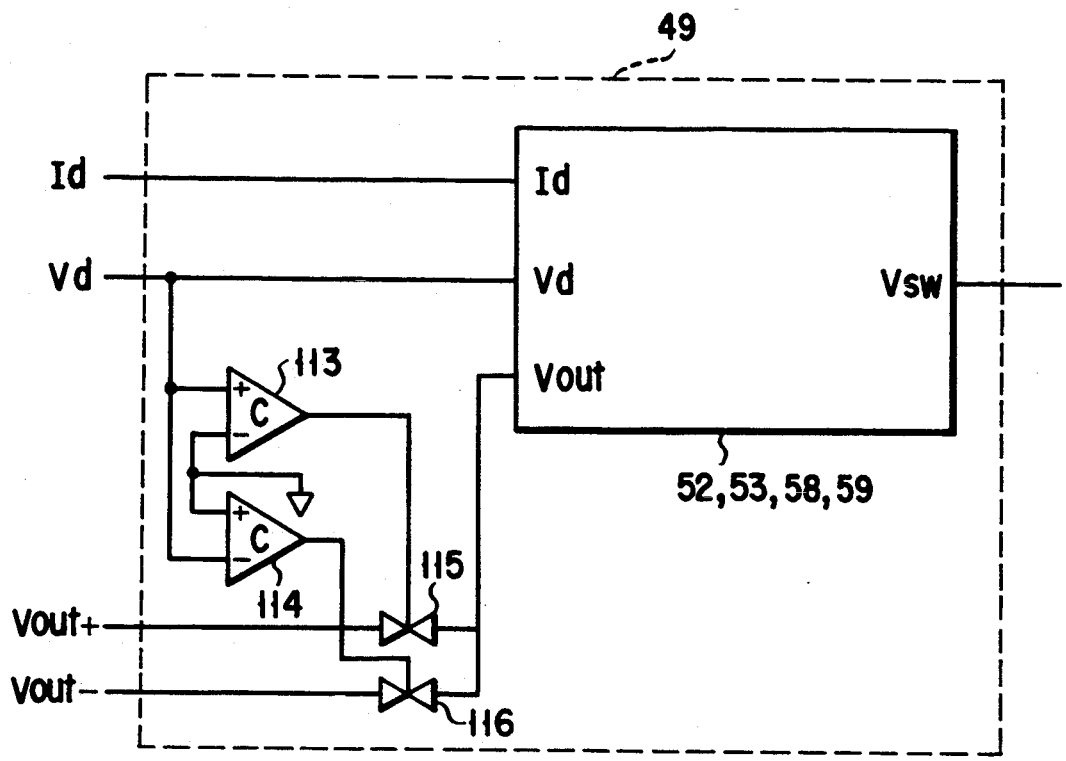
FIG. 33 is a block diagram showing the arrangement of another example of a controller for ON/OFF controlling switching elements of a chopper.

An example of the controller 49a to 49c is shown in FIG. 33 using a controller shown in FIG. 32. A controller 52, 53, 58, or 59 (described later) shown in FIG. 32 includes a NOT gate 108, an OR gate 107, an oscillator 106, a flip-flop 105, a comparator 104, differential amplifiers 103 and 101, a multiplexer 102, and absolute value amplifiers 120, 121, and 122. The rectified input voltage Vd, rectified input current Id, and output voltage Vout are input to the controller 52 or 53 and a switch control signal Vsw is produced. The switch control signal Vsw turns on the switch at a high level and turns off the switch at a low level.

The controller 49 includes the controller 52 or 53, comparators 113 and 114, and analog switches 115 and 116.

Figure 13B:
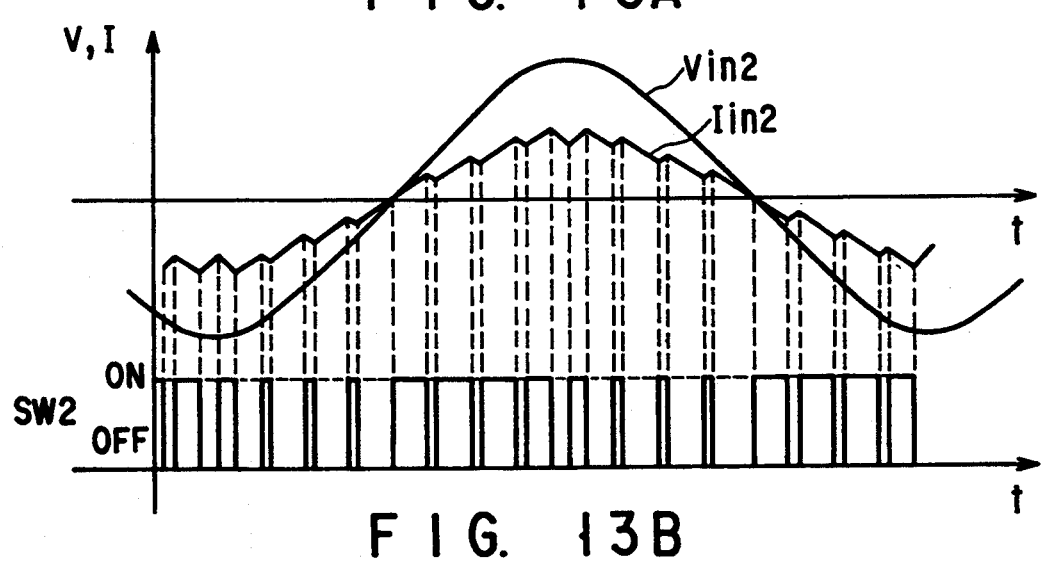

The phase "B" of the three-phase AC power source is operated at a phase difference of 120° with respect to the phase "A", as shown in FIG. 13B. When the bidirectional switch SW2 is turned on, the current flows in the choke coil 43b.

When the bidirectional switch SW2 is turned off, the energy accumulated in the choke coil 43b is discharged and transferred to the capacitors 45 and 47 through the diode D11 or D14 of the three-phase rectifying circuit 44.

When the bidirectional switch SW2 is turned on again, the current flows in the choke coil 43b as in the above case to charge the choke coil 43b, and the input current Iin2 increases.

When the bidirectional switch SW2 is turned off, the energy accumulated in the choke coil 43b is discharged and transferred to the capacitors 45 and 47 through the diode D11 or D14.

Figure 13C:
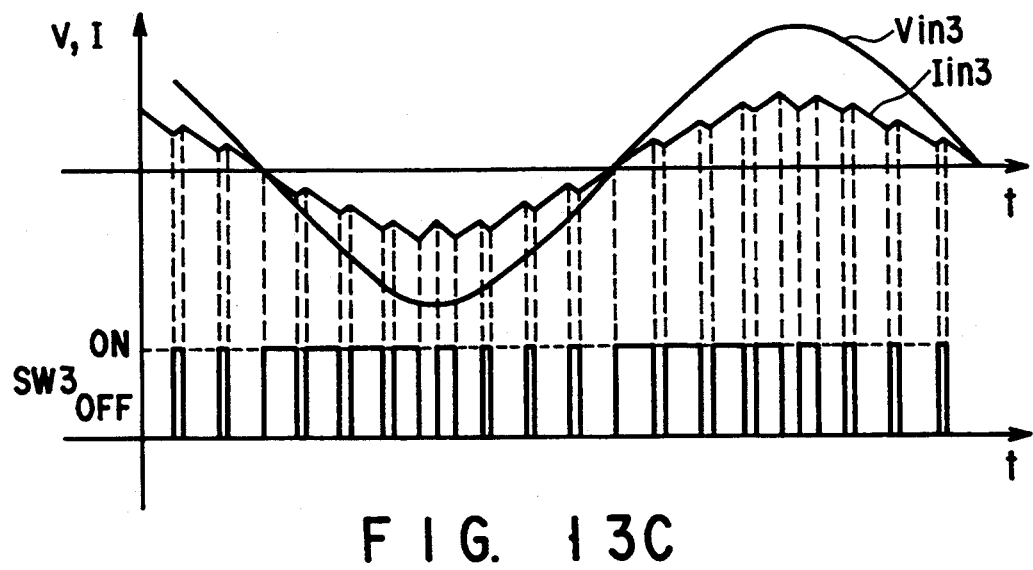

The phase "C" of the three-phase AC power source is operated at a phase difference of 240° with respect to the phase "A", as shown in FIG. 13C. When the bidirectional switch SW3 is turned on, the current flows in the choke coil 43c.

when the bidirectional switch SW3 is turned off, the energy accumulated in the choke coil 43c is discharged and transferred to the capacitors 45 and 47 through the diode D12 or D15 of the three-phase rectifying circuit 44.

When the bidirectional switch SW3 is turned on again, the current flows in the choke coil 43c as in the above case to charge the choke coil 43c, and the input rectified current Id3 increases.

when the bidirectional switch SW3 is turned off, the energy accumulated in the choke coil 43c is discharged and transferred to the capacitors 45 and 47 through the diode D12 or D15.

As described above, by repeating the ON/OFF control of the bidirectional switches SW1 to SW3, the input currents Iin1 to Iin3 can be controlled to be proportional to the input voltages Vin1 to Vin3, as shown in FIGS. 13A to 13C. That is, a high power factor can be obtained, and the harmonics of the input current can be reduced.

Figure 11:
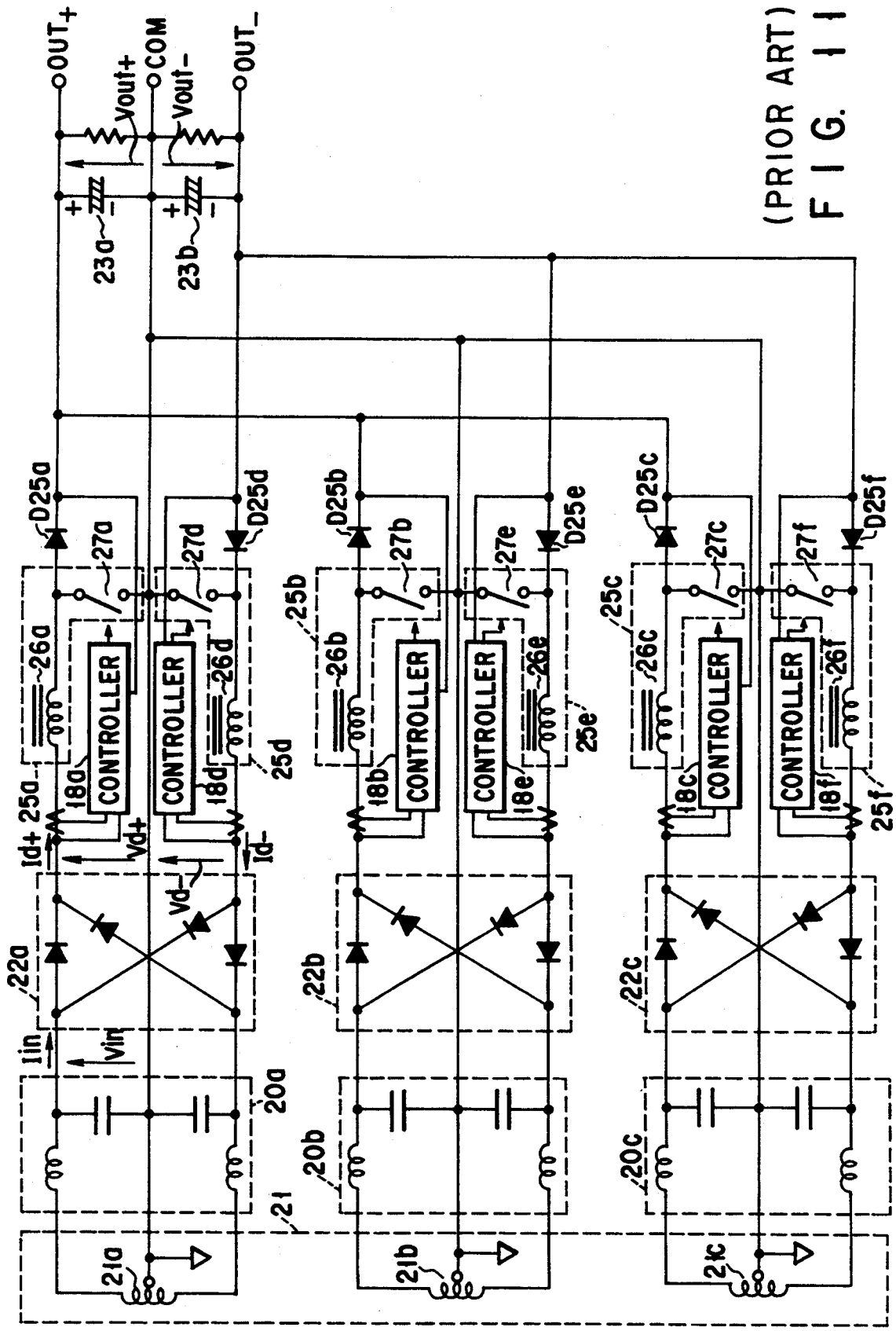
FIG. 11 is a block diagram showing the arrangement of a conventional three-phase input DC power source apparatus capable of outputting both positive and negative voltages.

As described above, in the first embodiment, the step-up chopper circuits 42a to 42c formed of the choke coils 43a to 43c and the bidirectional switches SW1 to SW3 are connected to the input side of the three-phase rectifying circuit 44, and the bidirectional switches SW1 to SW3 are connected to the neutral point (COM) of the three-phase AC power source, thereby obtaining both positive and negative outputs. For this reason, the number of components such as the choke coils 43a to 43c, the bidirectional switches SW1 to SW3, and the controllers 49a to 49c can be reduced to almost ½ that of the conventional DC power source apparatus shown in FIG. 11.

Other embodiments of the present invention will be described below. In the following description, the same reference numerals as in the first embodiment denote the same parts, and a detailed description thereof will be omitted.

Figure 16:
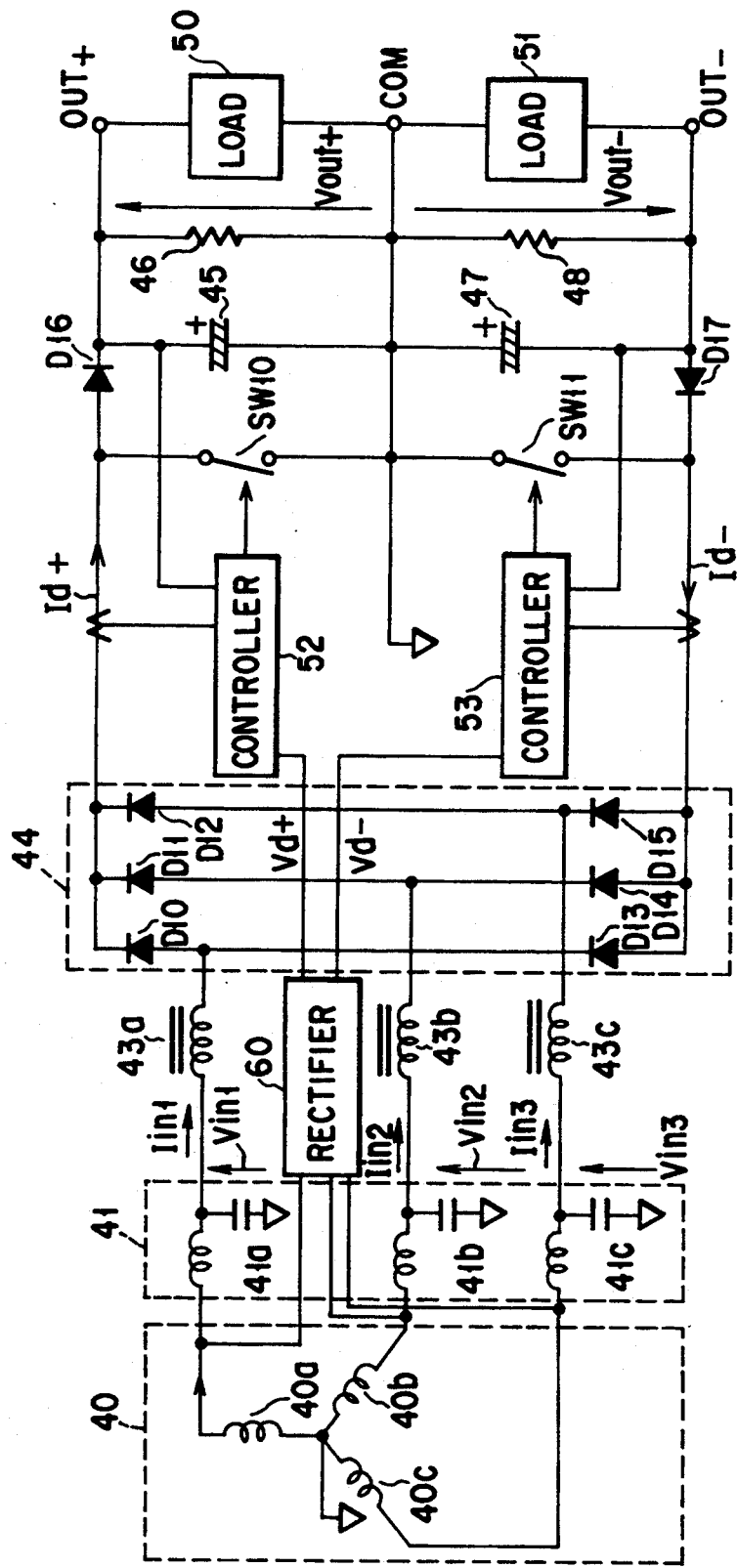
FIG. 16 is a block diagram showing the arrangement of a polyphase input DC power source apparatus according to a second embodiment of the present invention.

FIG. 16 is a block diagram showing the arrangement of a polyphase input DC power source apparatus according to the second embodiment, which is applied to a three-phase input and a positive/negative output.

The outputs of low-pass filters 41a to 41c are connected to a three-phase rectifying circuit 44 through choke coils 43a to 43c, respectively. The positive output terminal of the three-phase rectifying circuit 44 is connected to a capacitor 45 through a diode D16 in a forward direction, and the negative output terminal is connected to a capacitor 47 through a diode D17 in a reverse direction.

Figure 17:
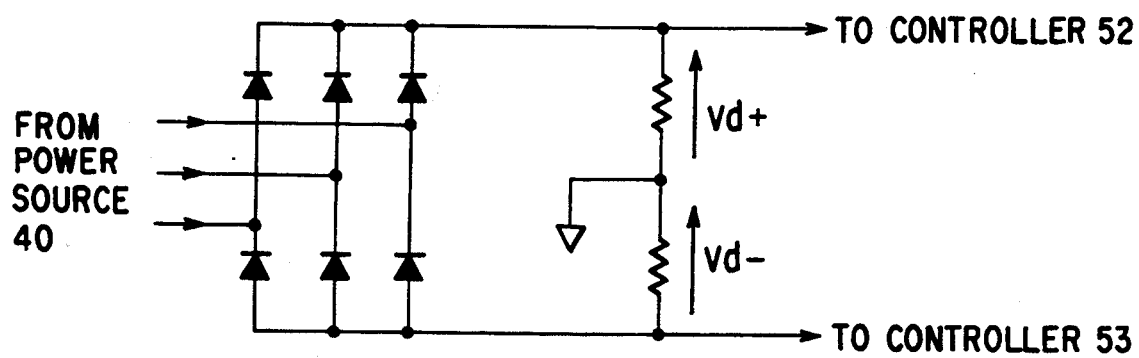
FIG. 17 is a block diagram showing the arrangement of a rectifying circuit for generating a reference voltage in the second embodiment.
Figure 18A:
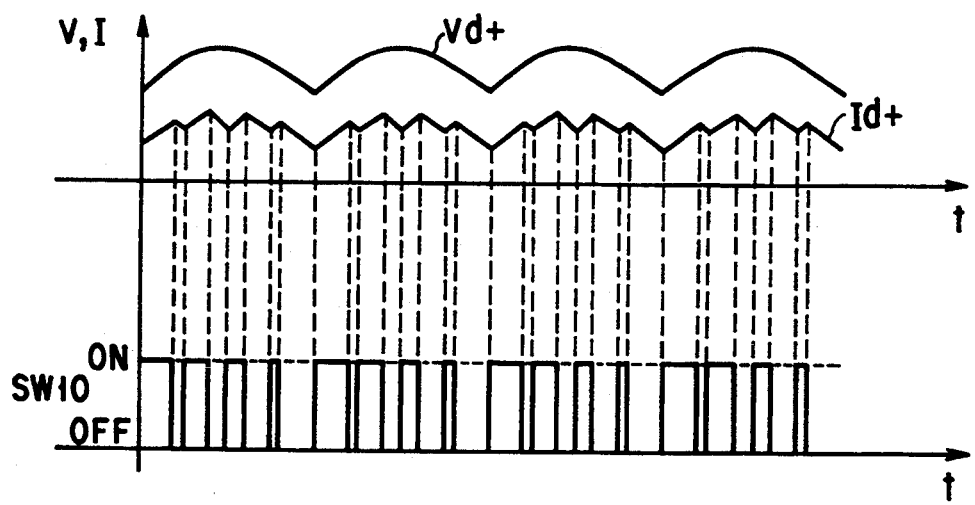
FIGS. 18A and 18B are timing charts showing chopping timings in step-up chopper circuits in the second embodiment.
Figure 18B:
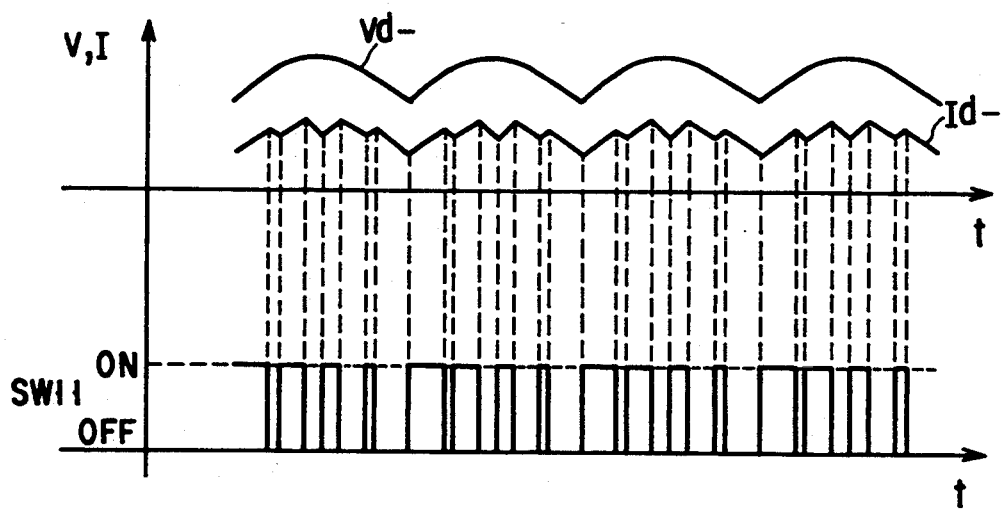

One terminal of each of unidirectional switches SW10 and SW11 is also connected to a corresponding one of the positive and negative output terminals. The unidirectional switches SW10 and SW11 and the choke coils 43a and 43c constitute step-up chopper circuits, respectively. The other terminal of each of the unidirectional switches SW10 and SW11 is connected to the neutral point (COM) of the three-phase power source. Controllers 52 and 53 (shown in FIG. 32) are connected to the unidirectional switches SW10 and SW11, respectively. The controllers 52 and 53 receive outputs of a rectifier 60 for rectifying the three-phase power source voltage as monitored input rectified voltages Vd+ and Vd−. The arrangement of the rectifier 60 is shown in FIG. 17, and the input rectified voltages Vd+ and Vd− are shown in FIGS. 18A and 18B.

Figure 1:
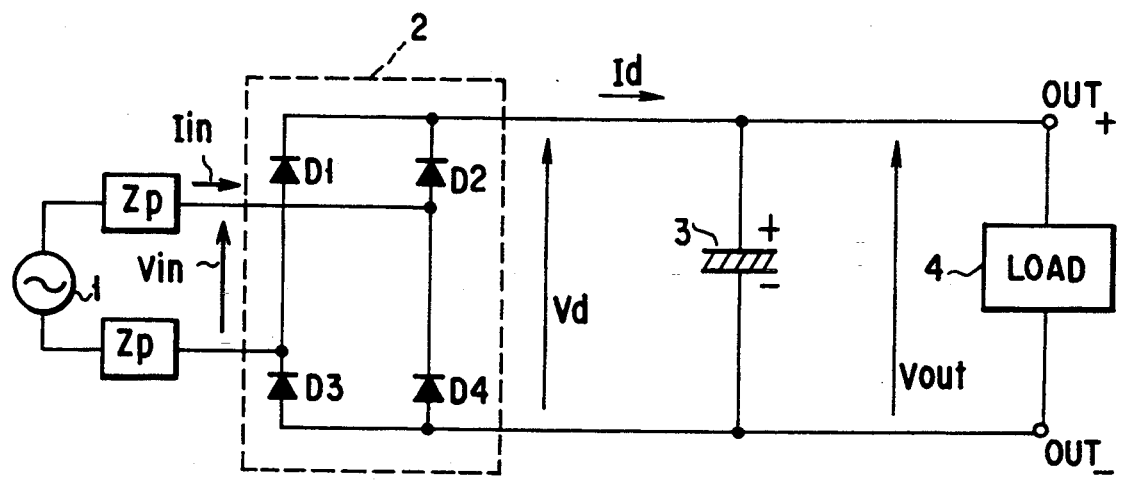
FIG. 1 is a block diagram showing the arrangement of a conventional single-phase input DC power source apparatus.
Figure 2:
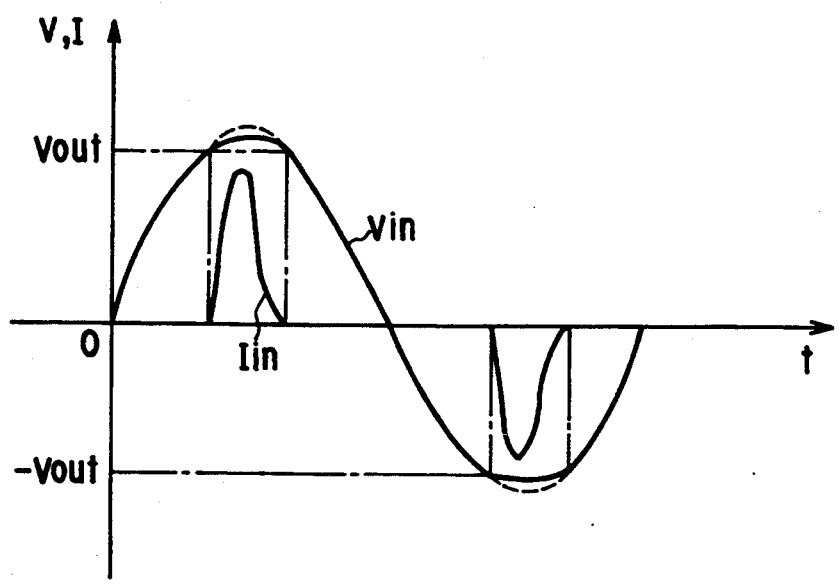
FIG. 2 is a graph showing the waveforms of an input voltage and an input current in the power source apparatus in FIG. 1.
Figure 3:
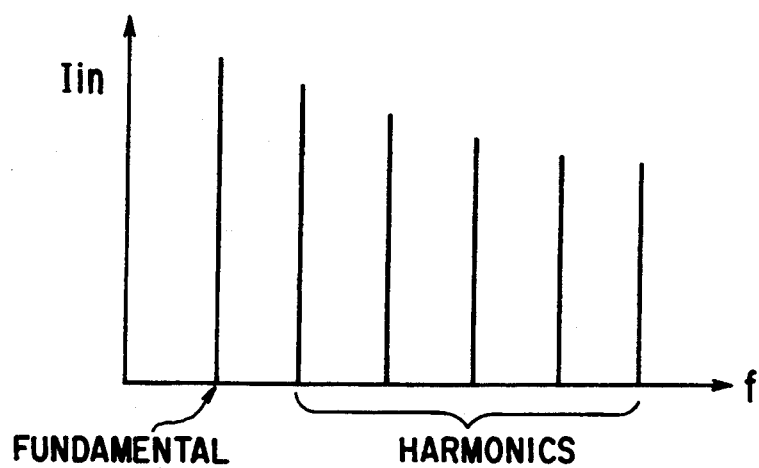
FIG. 3 is a graph showing the result obtained by Fourier-transforming the input current in the power source apparatus in FIG. 1.
Figure 4:
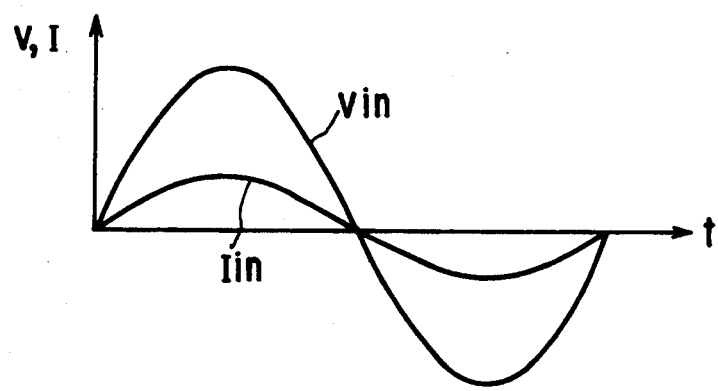
FIG. 4 is a graph showing the waveform of an input current for reducing the harmonic components of the input current in the power source apparatus in FIG. 1.
Figure 5:
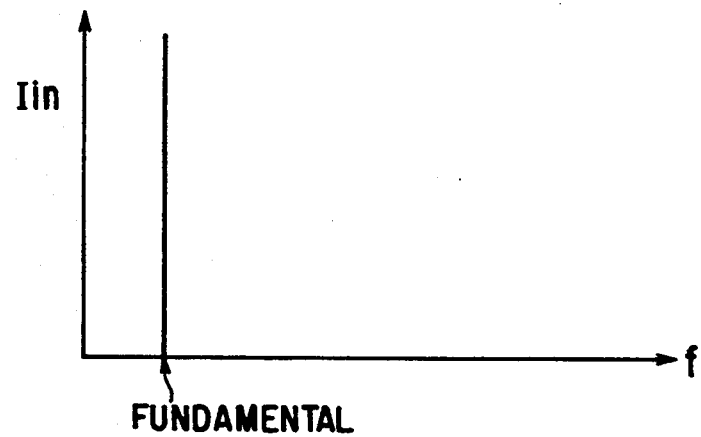
FIG. 5 is a graph showing the result obtained by Fourier-transforming the input current shown in FIG. 4.
Figure 6:
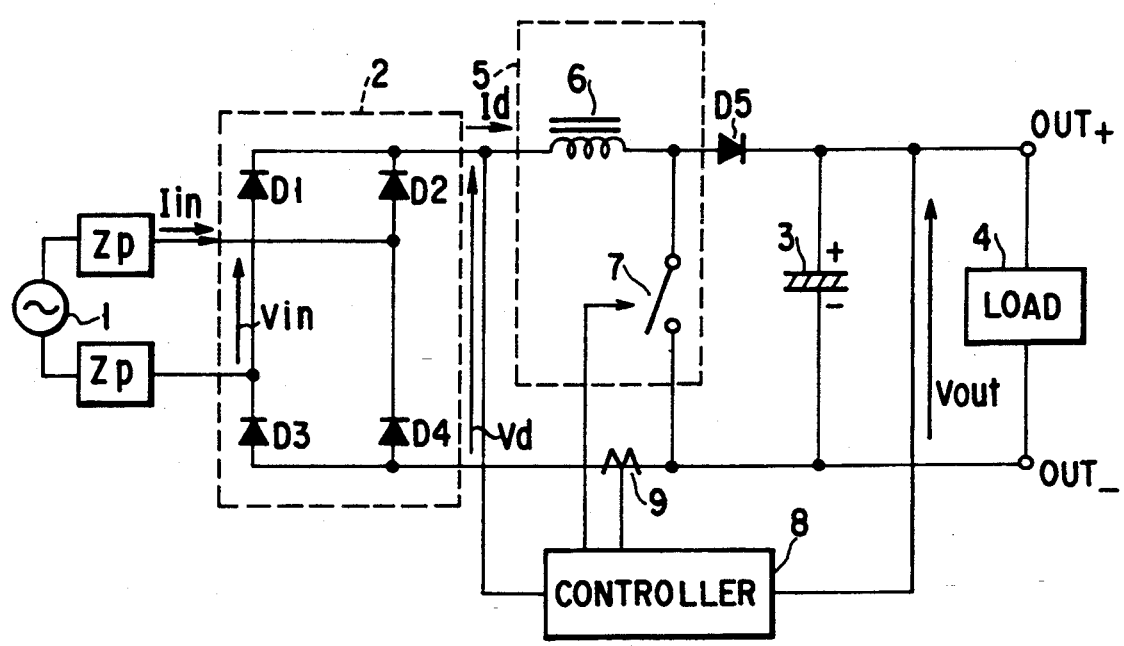
FIG. 6 is a block diagram showing a conventional power source apparatus for improving a power factor.
Figure 7:
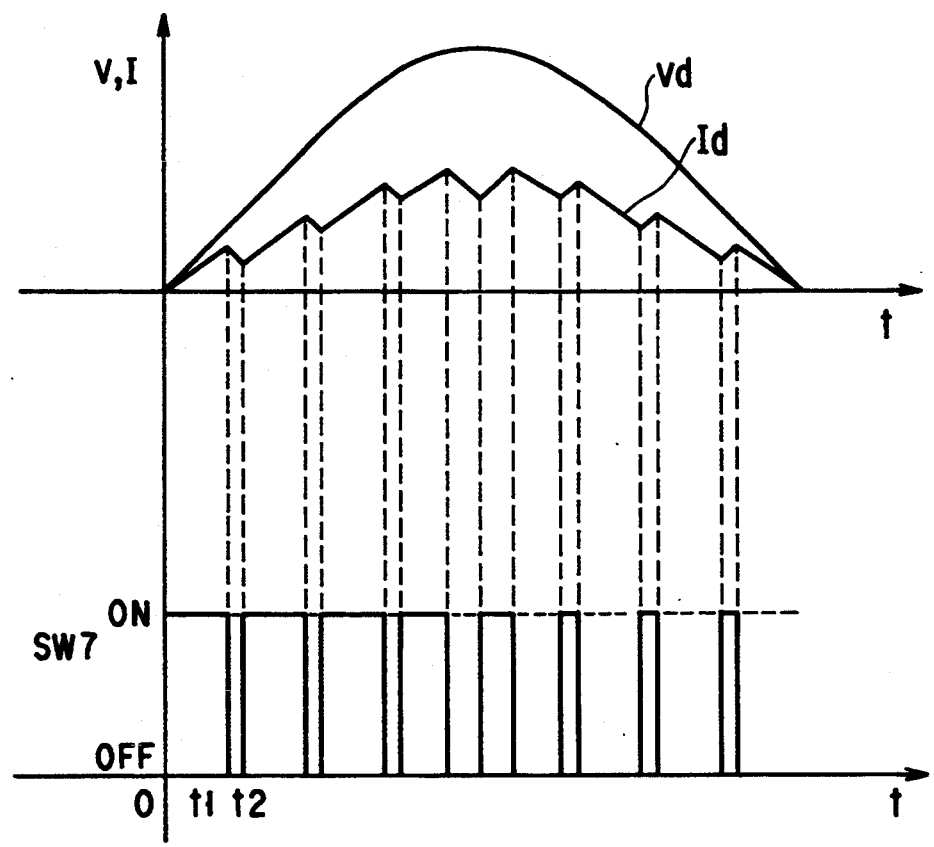
FIG. 7 is a graph showing a chopping timing in a step-up chopper circuit of the power source apparatus in FIG. 6.
Figure 8:
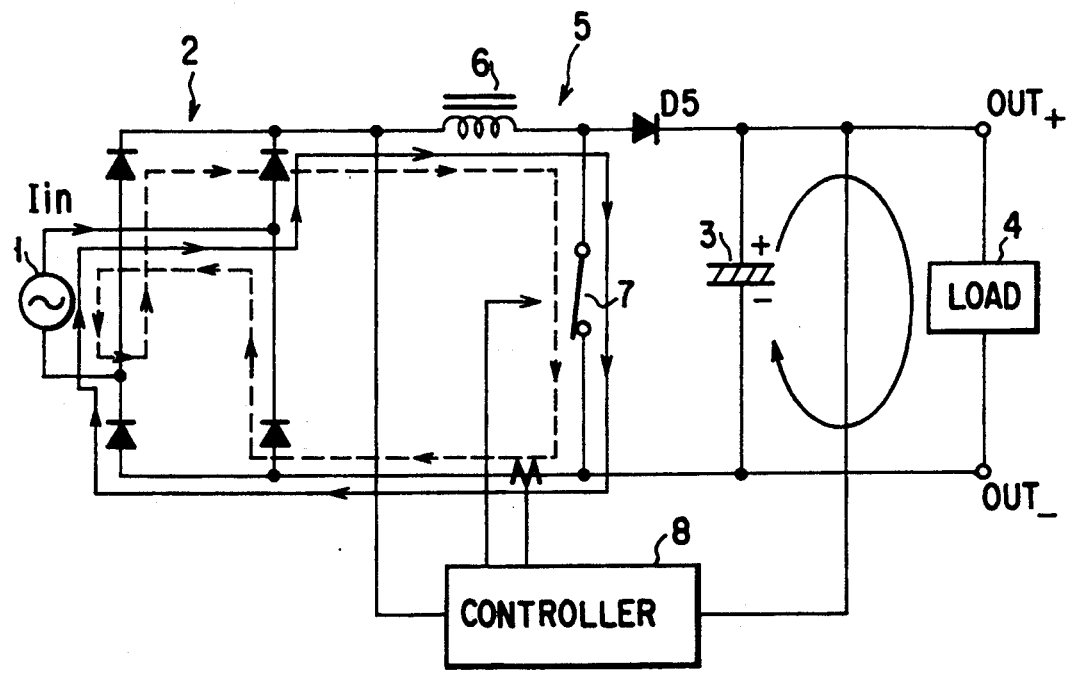
FIG. 8 is a block diagram showing an operation in an ON state of a switching element of the step-up chopper circuit of the power source apparatus in FIG. 6.
Figure 9:
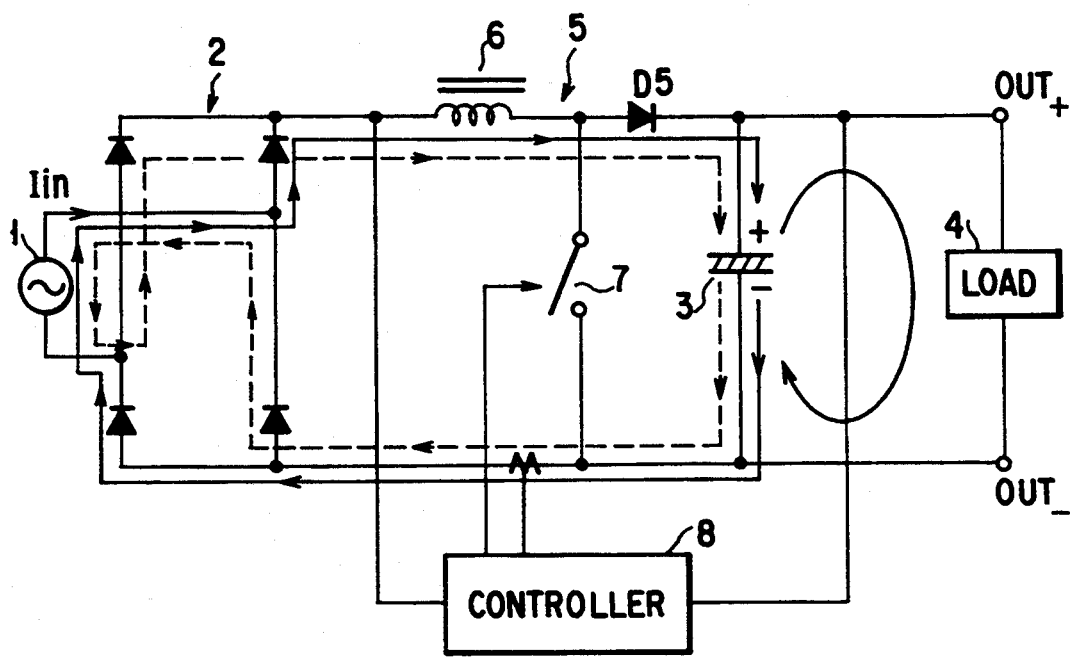
FIG. 9 is a block diagram showing an operation in an OFF state of the switching element of the step-up chopper circuit of the power source apparatus in FIG. 6.
Figure 10:
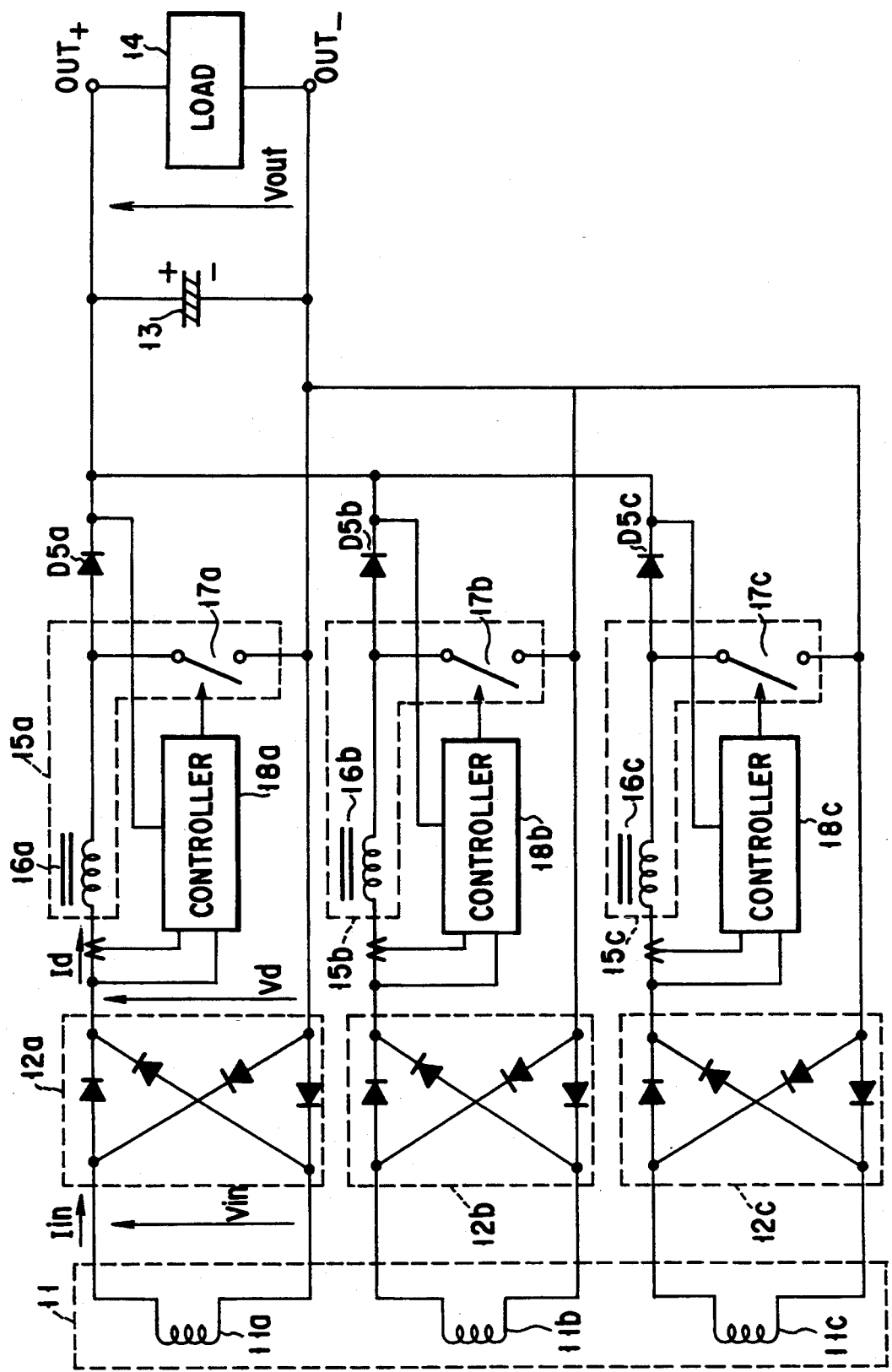
FIG. 10 is a block diagram showing the arrangement of a conventional three-phase input DC power source apparatus.

More specifically, the controller 52 monitors the positive input rectified voltage Vd+, positive input rectified current Id+, and output voltage Vout+ and the controller 53 monitors the negative input rectified voltage Vd−, negative input rectified current Id−, and output voltage Vout−. These controllers 52 and 53 ON/OFF-control the unidirectional switches SW10 and SW11, respectively, on the basis of these monitored values at timings shown in FIG. 7.

An operation of the second embodiment having the above arrangement will be described below. For the sake of descriptive convenience, the operations of the unidirectional switches SW10 and SW11 will be independently described. The current actually flowing in this power source apparatus is obtained by superposing the currents of the three phases flowing in accordance with the operations of the two switches SW10 and SW11.

Figure 19:
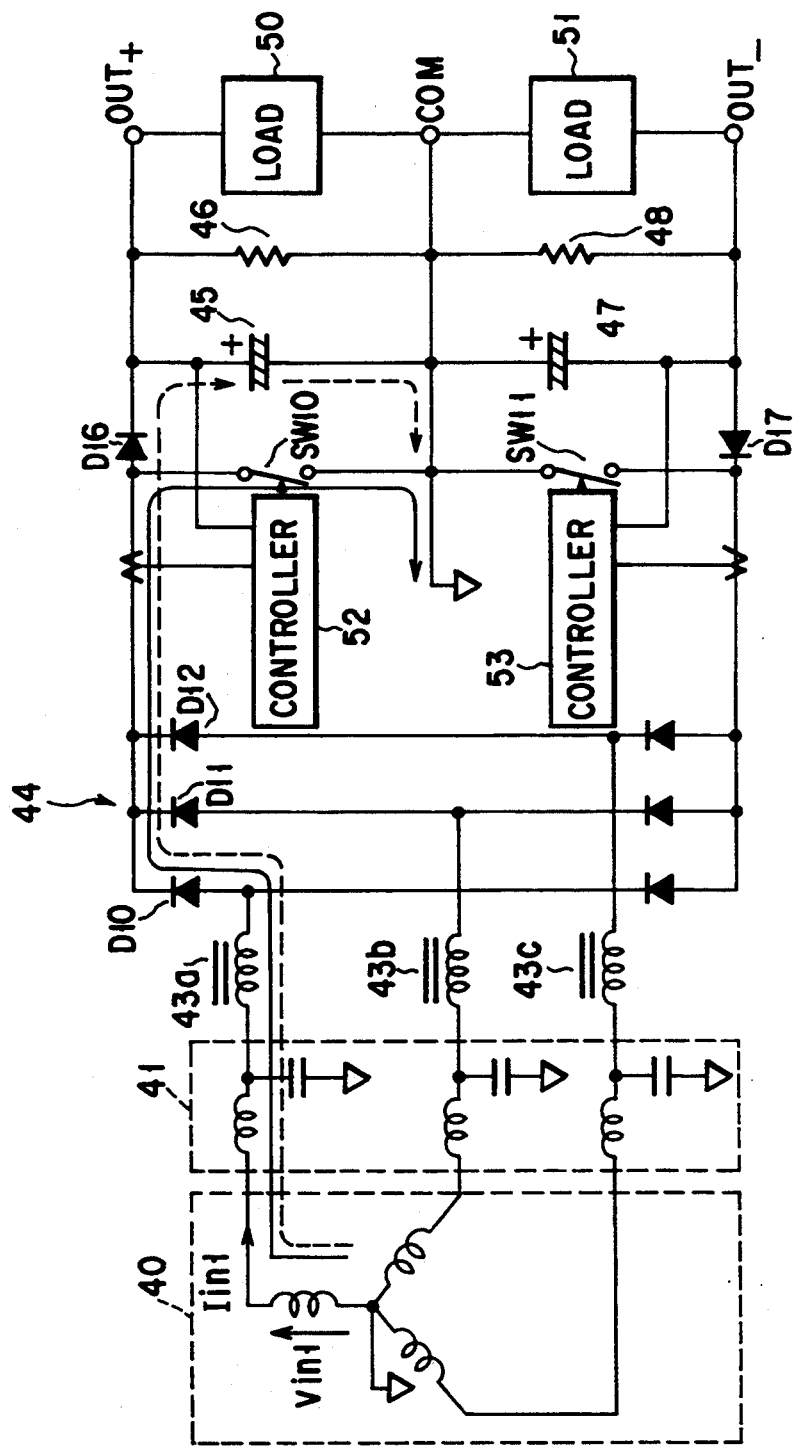
FIG. 19 is a block diagram showing an operation in an ON state of a switching element of the step-up chopper circuit in the second embodiment.

On the positive output terminal OUT+ side, when the controller 52 turns the unidirectional switch SW10 on, the current for an A-phase power source 40a flows in the choke coil 43a, as indicated by a solid line in FIG. 19 to accumulate the energy in the choke coils 43a to 43c. The currents for a B-phase power source 40b and a C-phase power source 40c also flow in the choke coils 43b and 43c to accumulate the energy.

When the unidirectional switch SW10 is turned off, the energy accumulated in the choke coils 43a to 43c is discharged and transferred to the capacitor 45 through diodes D10 to D12 and the output diode D16. The currents flowing in the choke coils 43a to 43c decrease. At this time, the current for the phase "A" flows through a path indicated by a broken line in FIG. 19.

When the unidirectional switch SW10 is turned on again, the currents flow in the choke coils 43a to 43c as in the above case to accumulate the energy in the choke coils 43a to 43c, and the current increases.

when the unidirectional switch SW10 is turned off again, the energy accumulated in the choke coils 43a to 43c is discharged and transferred to the capacitor 45 through the diodes D10 to D12 and the output diode D16.

As described above, by repeating the ON/OFF control of the unidirectional switch SW10, the positive input rectified current Id+ from the three-phase rectifying circuit 44 can be controlled in proportion to the positive input rectified voltage Vd+ from the rectifier 60, as shown in FIG. 18A.

Figure 20:
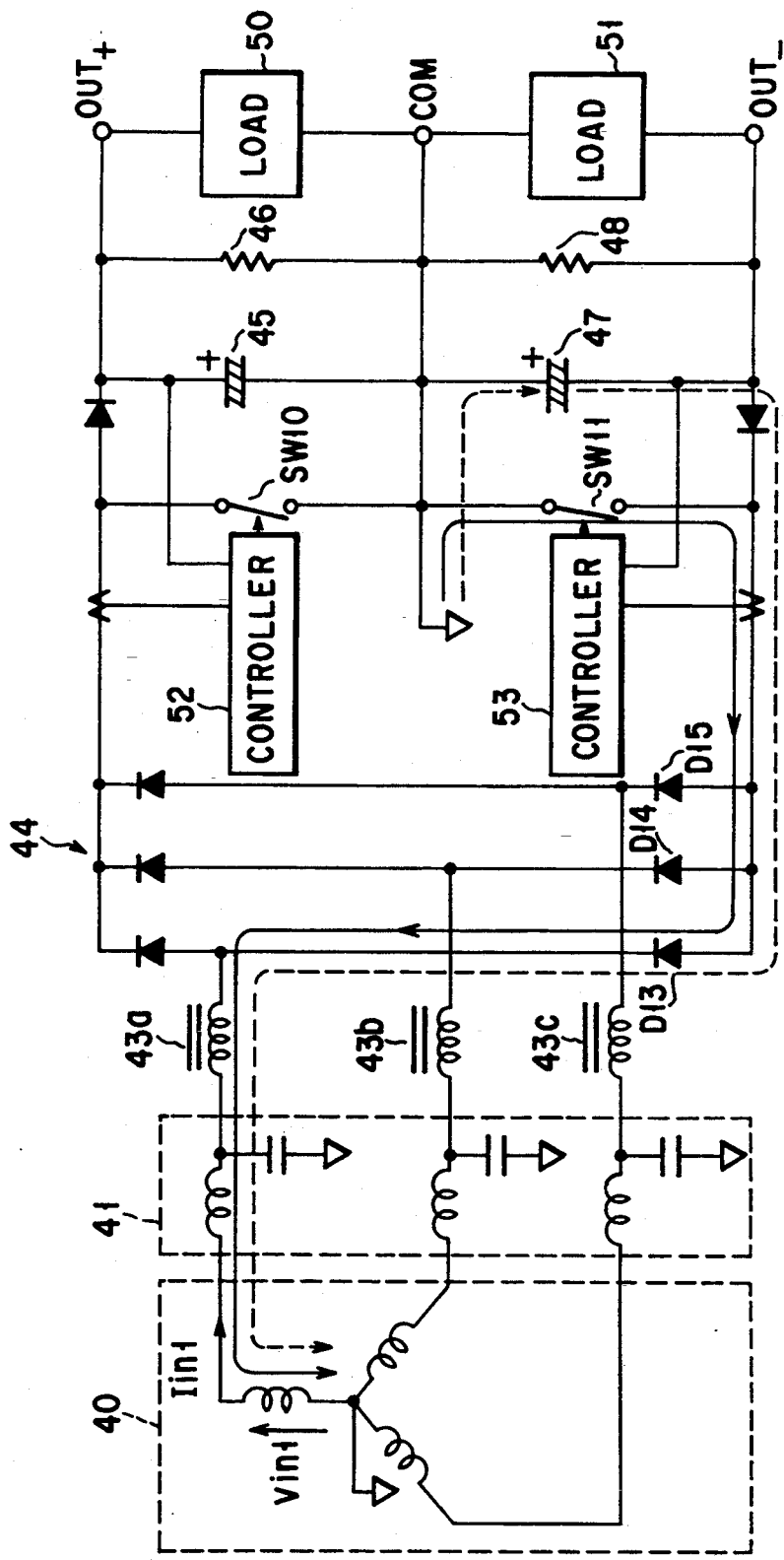
FIG. 20 is a block diagram showing an operation in an OFF state of the switching element of the step-up chopper circuit in the second embodiment.

On the other hand, also on the negative output terminal OUT− side, when the controller 53 turns the unidirectional switch SW11 on to cause the current to flow. At this time, the current for the A-phase power source 40a flows through a path indicated by a solid line in FIG. 20, and the energy is accumulated in the choke coil 43a. The currents for the B-phase power source 40b and the C-phase power source 40c also flow in the choke coils 43b and 43c to accumulate the energy.

When the unidirectional switch SW11 is turned off, the energy accumulated in the choke coils 43a to 43c is discharged and transferred to the capacitor 47 through diodes D13 to D15 and the output diode D17. The currents flowing in the choke coils 43a to 43c decrease. At this time, the current for the A-phase power source 40a flows through a path indicated by a broken line in FIG. 20.

When the unidirectional switch SW11 is turned on again, the currents flow in the choke coils 43a to 43c as in the above case to accumulate the energy in the choke coils 43a to 43c, and the current increases.

When the unidirectional switch SW11 is turned off, the energy accumulated in the choke coils 43a to 43c is discharged and transferred to the capacitor 47 through the diodes D13 to D15 and the diode D17.

As described above, by repeating the ON/OFF control of the unidirectional switch SW11, the negative input rectified current Id— from the three-phase rectifying circuit 44 can be controlled in proportion to the negative input rectified voltage Vd— from the rectifier 60, as shown in FIG. 18B.

The detailed circuit diagram of the controllers 52 and 53 is shown in FIG. 32.

Figure 21:
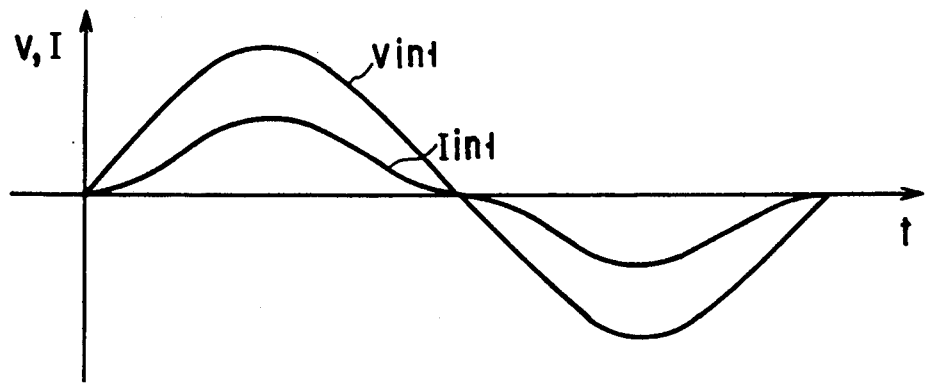
FIG. 21 is a chart showing the waveforms of an input voltage and an input current in the second embodiment.

FIG. 21 is a graph showing the waveforms of the A-phase input voltage Vin1 and input current Iin1 in the second embodiment. The waveforms of the B- and C-phase voltages and currents are the same except that they are phase-shifted by 120° and 240° with respect to the waveforms of the A-phase voltage and current.

As described above, according to the second embodiment, the choke coils 43a to 43c constituting the step-up chopper circuit are connected to the input side of the three-phase rectifying circuit 44, and the unidirectional switches SW10 and SW11 constituting the step-up chopper circuit are connected to the output side of the three-phase rectifying circuit 44. For this reason, the number of components such as the switching circuits and the controllers can be further decreased as compared to the first embodiment. In addition, the pulse waveform of the input current Iin with a large peak value can be effectively transformed to a waveform with no peak value shown in FIG. 21, thereby improving the power factor.

Figure 22:
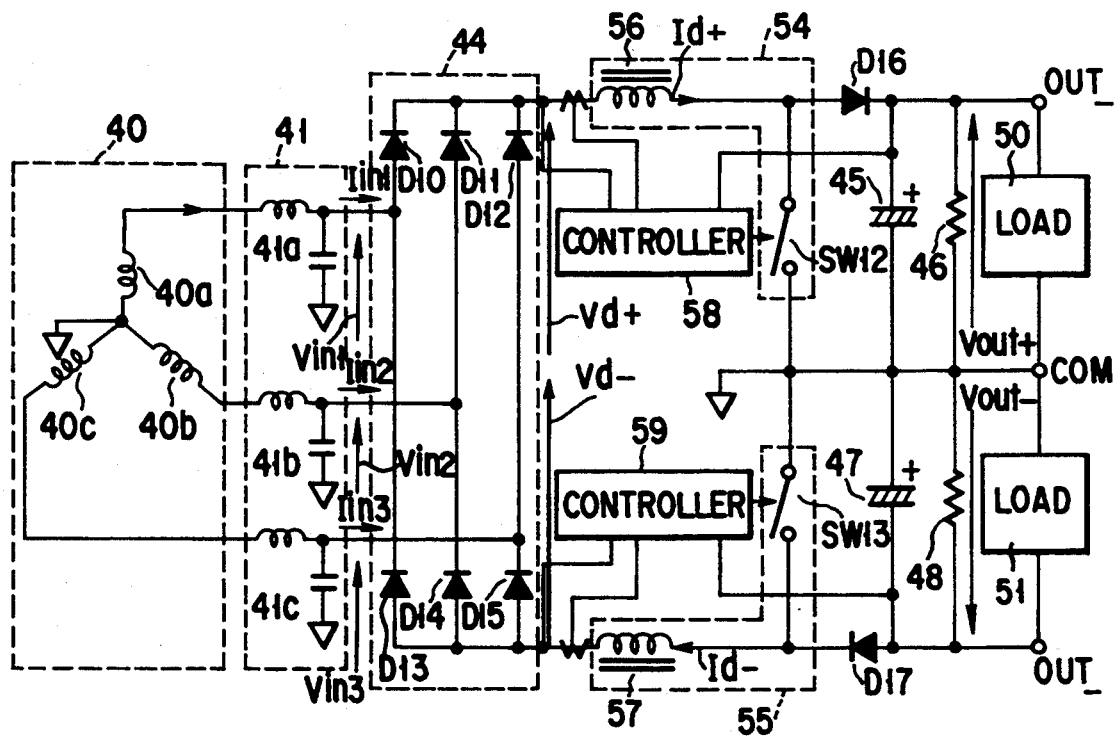
FIG. 22 is a block diagram showing the arrangement of a polyphase input DC power source apparatus according to a third embodiment of the present invention.

The third embodiment of the present invention will be described below. FIG. 22 is a block diagram showing the arrangement of a polyphase input DC power source apparatus applied to a three-phase input and a positive/- negative output according to the third embodiment.

The output terminals of low-pass filters 41a to 41c are connected to a three-phase rectifying circuit 44.

A step-up chopper circuit 54 is connected to the positive output terminal of the three-phase rectifying circuit 44, and a step-up chopper circuit 55 is connected to the negative output terminal. The step-up chopper circuits 54 and 55 are formed of choke coils 56 and 57 and unidirectional switches SW12 and SW13, respectively. The connection point between the choke coil 56 and the unidirectional switch SW12 is connected to one terminal of a capacitor 45, and the connection point between the choke coil 57 and the unidirectional switch SW13 is connected to one terminal of a capacitor 47. Controllers 58 and 59 (shown in FIG. 32) are connected to the step-up chopper circuits 54 and 55.

The controller 58 monitors the positive input rectified voltage Vd+ and positive input rectified current Id+ from the three-phase rectifying circuit 44 and the positive output voltage Vout+, and the controller 59 monitors the negative input rectified voltage Vd— and negative input rectified current Id— from the three-phase rectifying circuit 44 and the negative output voltage Vout—. These controllers 58 and 59 ON/OFF-control the unidirectional switches SW12 and SW13 on the basis of these monitored values at the same timings as shown in FIGS. 18A and 18B.

The detailed circuit diagram of the controllers 58 and 59 is shown in FIG. 32.

An operation of the third embodiment having the above arrangement will be described below. For the sake of descriptive convenience, the operations of the unidirectional switches SW12 and SW13 will be independently described. The current actually flowing in this power source apparatus is obtained by superposing the currents of the three phases flowing in accordance with the operations of the two switches SW12 and SW13.

Figure 23:
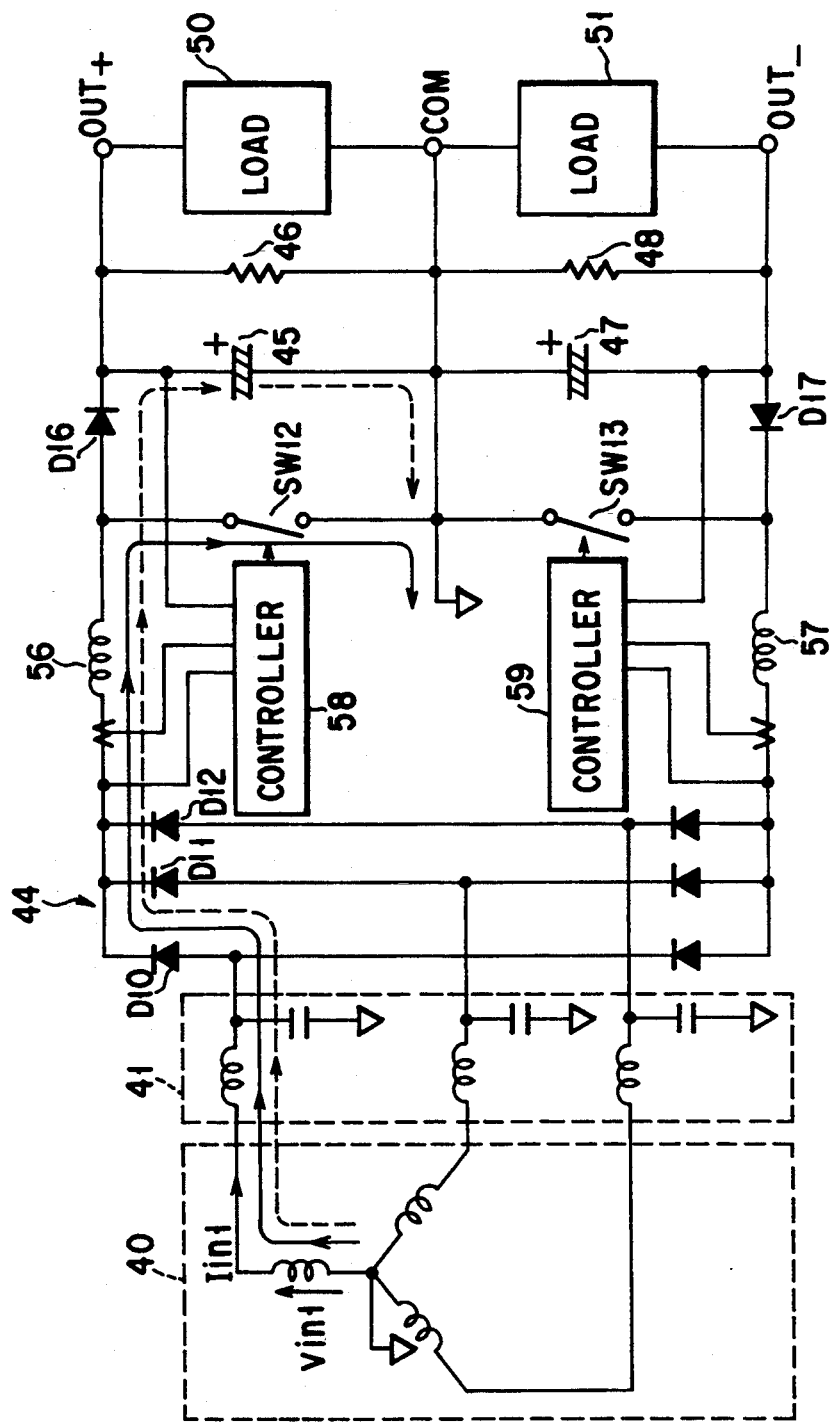
FIG. 23 is a block diagram showing an operation in an ON state of a switching element of a step-up chopper circuit in the third embodiment.

On the positive output terminal OUT+ side, when the controller 58 turns the unidirectional switch SW12 on, the current for an A-phase power source 40a flows in the choke coil 56 through a diode D10, as indicated by a solid line in FIG. 23 to accumulate the energy in the choke coil 56. The controller 58 also causes the currents for a B-phase power source 40b and a C-phase power source 40c to flow in the choke coil 56 through diodes D11 add D12 to accumulate the energy.

When the unidirectional switch SW12 is turned off, the energy accumulated in the choke coil 56 is discharged and transferred to the capacitor 45 through the output diode D16. At this time, the A-phase current flows through a path indicated by a broken line in FIG. 23.

When the unidirectional switch SW12 is turned on again, the current flows in the choke coil 56 as in the above case to accumulate the energy, and the current increases.

When the unidirectional switch SW12 is turned off again, the energy accumulated in the choke coil 56 is discharged and transferred to the capacitor 45 through the output diode D16, and the current decreases.

As described above, by repeating the ON/OFF control of the unidirectional switch SW12, the positive input rectified current Id+ from the three-phase rectifying circuit 44 can be controlled in proportion to the positive input rectified voltage Vd+ from the rectifying circuit 44, as shown in FIG. 18A as in the second embodiment.

Figure 24:
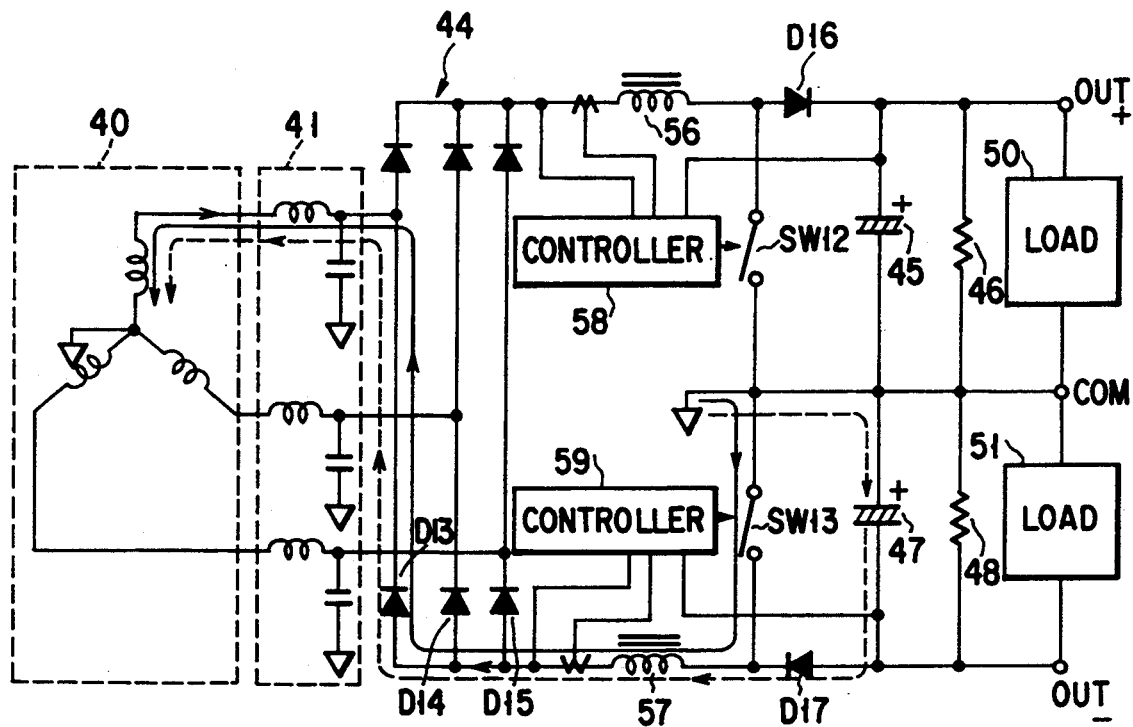
FIG. 24 is a block diagram showing an operation in an OFF state of the switching element of the step-up chopper circuit in the third embodiment.

On the other hand, also on the negative output terminal OUT—side, when the controller 59 turns the unidirectional switch SW13 on, the current for an A-phase power source 40a flows in the choke coil 57 through a diode D13, as indicated by a solid line in FIG. 24 to accumulate the energy in the choke coil 57. The controller 59 also causes the currents for a B-phase power source 40b and a C-phase power source 40c to flow in the choke coil 57 through diodes D14 add D15 to accumulate the energy.

When the unidirectional switch SW13 is turned off, the energy accumulated in the choke coil 57 is discharged and transferred to the capacitor 47 through the output diode D17. At this time, the A-phase current flows through a path indicated by a broken line in FIG. 24, and the current flowing the choke coil 57 decreases.

When the unidirectional switch SW13 is turned on again, the current flows in the choke coil 57 as in the above case to accumulate the energy, and the current increases.

When the unidirectional switch SW13 is turned off again, the energy accumulated in the choke coil 57 is discharged and transferred to the capacitor 47 through the output diode D17, and the current decreases.

As described above, by repeating the ON/OFF control of the unidirectional switch SW13, the negative input rectified current Id— from the three-phase rectifying circuit 44 can be controlled in proportion to the negative input rectified voltage Vd— from the rectifying circuit 44, as shown in FIG. 18B as in the second embodiment.

Figure 25:
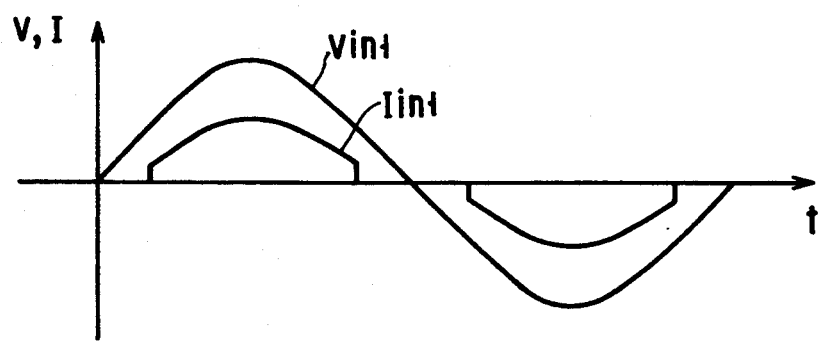
FIG. 25 is a graph showing the waveforms of an input voltage and an input current in the third embodiment.

FIG. 25 is a graph showing the waveforms of A-phase input voltage Vin1 and input current Iin1 in the third embodiment. The waveforms of the B- and C-phase voltages and currents are the same except that they are phase-shifted by 120° and 240° with respect to the waveforms of the A-phase voltage and current.

According to the third embodiment, the step-up chopper circuits 54 and 55 are connected to the output side of the three-phase rectifying circuit 44, and the unidirectional switches SW12 and SW13 constituting the step-up chopper circuits are connected to the neutral point (COM) of the three-phase power source. For this reason, the number of components of the choke coils can be decreased as compared to the second embodiment, thereby reducing the cost. In addition, the pulse waveform of the input current Iin with a large peak value can be effectively transformed to a waveform with no peak value shown in FIG. 25, thereby improving the power factor.

The above three embodiments are related to a power source apparatus for obtaining both positive and negative output voltages. However, an embodiment of a power source apparatus for obtaining an output voltage of single polarity will be described below.

FIG. 26 is a block diagram showing the arrangement of the fourth embodiment. The fourth embodiment differs from the first embodiment in the following point. A load 62 is connected between a positive output terminal OUT$_+$ and a negative output terminal OUT$_-$. Therefore, a voltage of single polarity represented by the sum of the voltage drops of resistors 46 and 48 caused due to the current discharged from capacitors 45 and 47 is applied to the load 62.

FIG. 27 is a block diagram showing the arrangement of the fifth embodiment. The fifth embodiment differs from the second embodiment in the following point. A load 64 is connected between a positive output terminal OUT$_+$ and a negative output terminal OUT$_-$. Therefore, a voltage of single polarity represented by the sum of the voltage drops of resistors 46 and 48 caused due to the current discharged from capacitors 45 and 47 is applied to the load 64.

Figure 28:
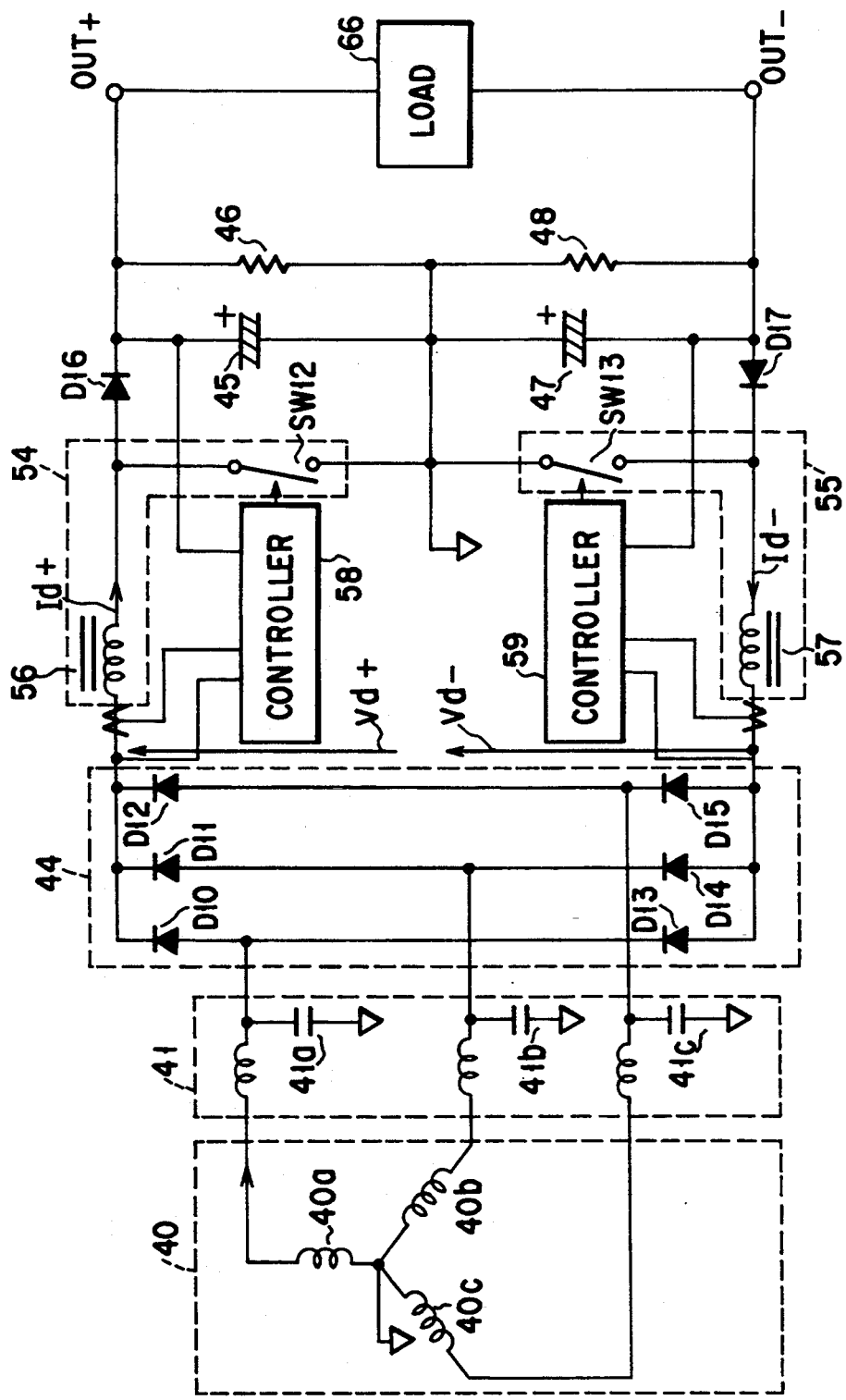
FIG. 28 is a block diagram showing the arrangement of a polyphase Input DC power source apparatus according to a sixth embodiment of the present invention.

FIG. 28 is a block diagram showing the arrangement of the sixth embodiment. The sixth embodiment differs from the third embodiment in the following point. A load 66 is connected between a positive output terminal OUT$_+$ and a negative output terminal OUT$_-$. Therefore, a voltage of single polarity represented by the sum of the voltage drops of resistors 46 and 48 caused due to the current discharged from capacitors 45 and 47 is applied to the load 66.

In the above embodiments, the secondary windings of the three-phase AC power source are star-connected to each other. However, in the following embodiments, the secondary windings of the three-phase AC power source are delta-connected to each other.

FIG. 29 is a block diagram showing the arrangement of the seventh embodiment. In the seventh embodiment, a three-phase AC power source 70 is connected to a three-phase rectifying circuit 74 through a filter 71 and a step-up chopper circuit 72, as in the first and fourth embodiments. Secondary windings 70a to 70c, each corresponding to one phase of the three-phase AC power source 70, are delta-connected to each other. Each of the connection points between the secondary windings is connected to one terminal of a corresponding one of choke coils 73a to 73c through a corresponding low-pass filter comprising an LC. The other terminal of each of the choke coils 73a to 73c is commonly connected through switches SW1 to SW3, and connected to a corresponding one of the input terminals of the three-phase rectifying circuit 74. The two output terminals of the three-phase rectifying circuit 74 are connected to a positive output terminal OUT$_+$ and a negative output terminal OUT$_-$, respectively. A capacitor 75 and a resistor 76 are connected in parallel between the positive output terminal OUT$_+$ and the negative output terminal OUT$_-$, and a load 78 is connected in parallel to the resistor 76.

Although no controller for controlling the switches SW1 to SW3 is shown in FIG. 29, the switches SW1 to SW3 are controlled as in the first and fourth embodiments to make the input current proportional to the input voltage.

FIG. 30 is a block diagram showing the arrangement of the eighth embodiment. In the eighth embodiment, a three-phase AC power source 80 is connected to a three-phase rectifying circuit 84 through a filter 81 and choke coils 83a to 83c, as in the second and fifth embodiments. Secondary windings 80a to 80c, each corresponding to one phase of the three-phase AC power source 80, are delta-connected to each other. Each of the connection points between the secondary windings is connected to one terminal of a corresponding one of choke coils 83a to 83c through a corresponding low-pass filter comprising an LC. The other terminal of each of the choke coils 83a to 83c is connected to a corresponding one of the input terminals of the three-phase rectifying circuit 84. The two output terminals of the three-phase rectifying circuit 84 are connected to a positive output terminal OUT$_+$ via an output diode 88 and to a negative output terminal OUT$_-$, respectively. A switch SW10 constituting a step-up chopper circuit together with the choke coils 83a to 83c, a capacitor 85, and a resistor 86 are connected in parallel between the positive output terminal OUT$_+$ and the negative output terminal OUT$_-$, and a load 88 is connected in parallel to the resistor 86.

Although no controller for controlling the switch SW10 is shown in FIG. 30, the switch SW10 is controlled as in the second and fifth embodiments to make the input current proportional to the input voltage.

Figure 31:
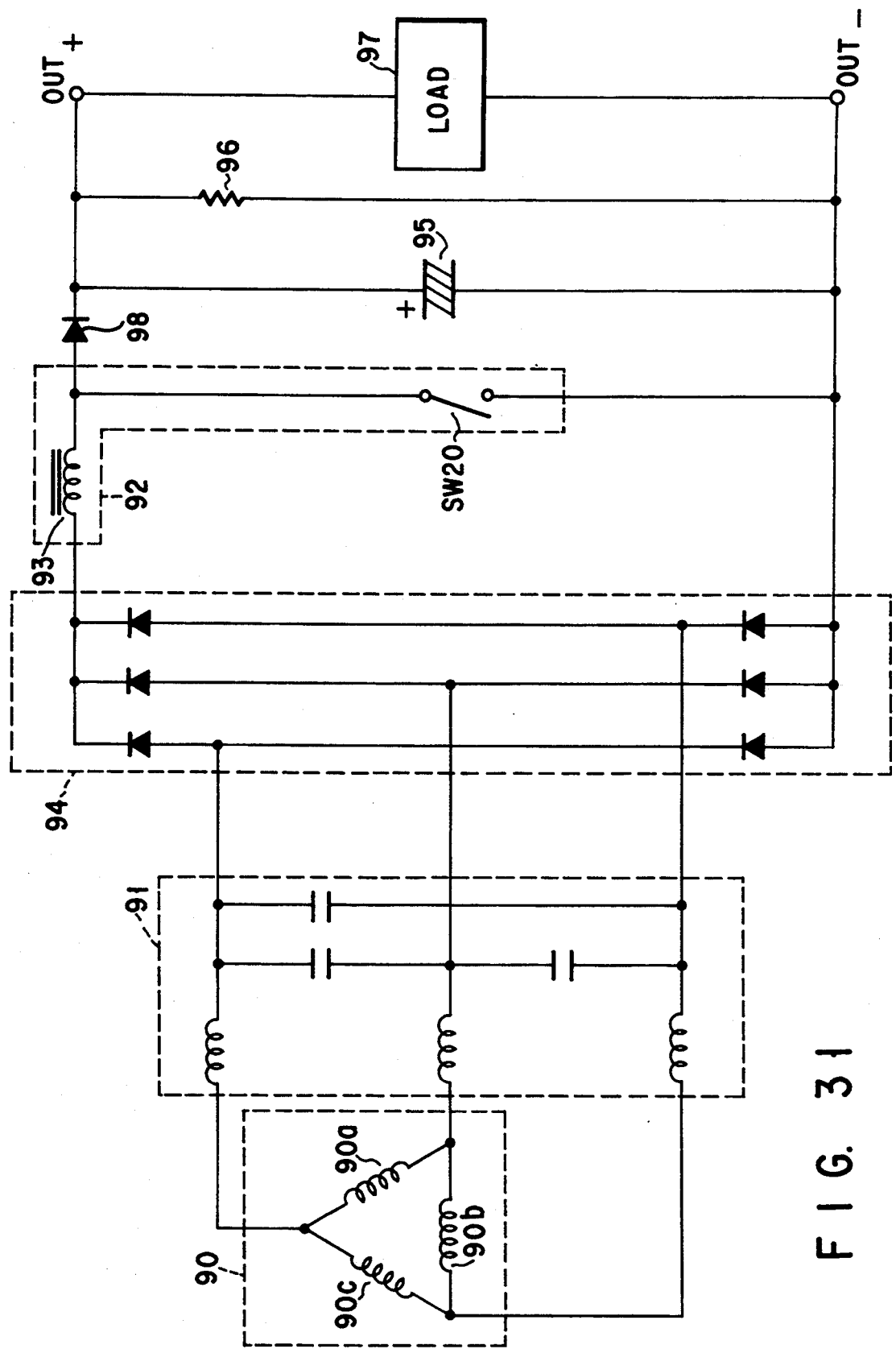
FIG. 31 is a block diagram showing the arrangement of a polyphase Input DC power source apparatus according to a ninth embodiment of the present invention.

FIG. 31 is a block diagram showing the arrangement of the ninth embodiment. In the ninth embodiment, a three-phase AC power source 90 is connected to a three-phase rectifying circuit 94 through a filter 91, as in the third and sixth embodiments. Secondary windings 90a to 90c, each corresponding to one phase of the three-phase AC power source 90, are delta-connected to each other. Each of the connection points between the secondary windings is connected to a corresponding one of the input terminals of the three-phase rectifying circuit 94 through a corresponding low-pass filter comprising an LC. One output terminal of the three-phase rectifying circuit 94 is connected to a positive output terminal OUT$_+$ through a choke coil 93 and an output diode 98, and the other output terminal of the three-phase rectifying circuit 94 is connected to a negative output terminal OUT$_-$. A switch SW20 constituting a step-up chopper circuit 92 together with the choke coil 93, a capacitor 95, and a resistor 96 are connected in parallel between the positive output terminal OUT$_+$ and the negative output terminal OUT$_-$, and a load 98 is connected in parallel to the resistor 96.

Although no controller for controlling the switch SW20 is shown in FIG. 31, the switch SW20 is controlled as in the third and sixth embodiments to make the input current proportional to the input voltage.

As has been described above, according to the present invention, there is provided a DC current source apparatus which can decrease the number of components such as choke coils or switching elements even in an application to a polyphase AC power source, thereby simplifying the circuit arrangement and reducing the cost.

Additional advantages and modifications will readily occur to those skilled in the art. Therefore, the present invention in its broader aspects is not limited to the specific details, representative de vices, and illustrated examples shown and described herein. Accordingly, various modifications may be made without departing from the spirit or scope of the general inventive concept as defined by the appended claims and their equivalents. For example, in the above embodiments, the application to a three-phase AC power source has been described. However, the present invention can be also applied to a polyphase (more than three-phase) AC power source. In addition, the polyphase rectifying circuit may have an arrangement for half-wave or full-wave rectification.

What is claimed is:

1. A polyphase AC input to DC output voltage converter comprising:
   a plurality of chopper circuits each connected to a corresponding phase of a polyphase AC power source and formed of a plurality of reactors excited upon application of a voltage and a plurality of switching elements for chopping currents flowing in said plurality of reactors;
   a polyphase rectifying circuit for rectifying polyphase AC currents output from said plurality of chopper circuits; and
   means for ON/OFF-controlling said plurality of switching elements such that a current flowing in each phase of said polyphase AC power source is substantially proportional to a voltage of each phase.

2. The voltage converter of claim 2, wherein said controlling means includes means for monitoring the current flowing in each phase of said polyphase AC power source, the voltage of each phase, and an output voltage of the apparatus to control an ON/OFF timing of said switching element.

3. A polyphase AC input to DC output voltage converter comprising:
   a plurality of chopper circuits each connected to a corresponding phase of a polyphase AC power source and formed of a plurality of reactors excited upon application of a voltage and a plurality of switching elements for chopping currents flowing in said plurality of reactors;
   a plurality of secondary windings, each corresponding to one phase of said polyphase AC power source, wherein the secondary windings are star-connected to each other at a neutral point, and further, wherein said plurality of switching elements are connected between said plurality of reactors and the neutral point;
   a polyphase rectifying circuit for rectifying polyphase AC currents output from said plurality of chopper circuits; and
   means for ON/OFF-controlling said plurality of switching elements such that a current flowing in each phase of said polyphase AC power source is substantially proportional to a voltage of each phase.

4. The voltage converter of claim 2, further comprising:
   two capacitors connected in series between positive and negative output terminals of said rectifying circuit and having a common connection point connected to the neutral point; and
   two loads connected in series between said positive and said negative output terminals of said rectifying circuit and having a common connection point connected to the neutral point.

5. The voltage converter of claim 2, further comprising:
   two capacitors connected in series between positive and negative output terminals of said rectifying circuit and having a common connection point connected to the neutral point; and
   a load connected between said positive and said negative output terminals of said rectifying circuit.

6. A polyphase AC input to DC output voltage converter comprising:
   a plurality of chopper circuits each connected to a corresponding phase of a polyphase AC power source and formed of a plurality of reactors excited upon application of a voltage and a plurality of switching elements for chopping currents flowing in said plurality of reactors, wherein said plurality of switching elements are connected between two of the plurality of reactors;
   a plurality of secondary windings, each corresponding to one phase of said polyphase AC power source, wherein the secondary windings are delta-connected to each other;
   a polyphase rectifying circuit for rectifying polyphase AC currents output from said plurality of chopper circuits;
   a capacitor connected between positive and negative output terminals of said rectifying circuit;
   a load connected between said positive and said negative output terminals of said rectifying circuit; and
   means for ON/OFF-controlling said plurality of switching elements such that a current flowing in each phase of said polyphase AC power source is substantially proportional to a voltage of each phase.

7. The voltage converter of claim 6, wherein said controlling means includes means for monitoring the current flowing in each phase of said polyphase AC power source, the voltage of each phase, and an output voltage of the apparatus to control an ON/OFF timing of said switching element.

8. A polyphase AC input to DC output voltage converter comprising:
   a plurality of reactors each connected to a corresponding phase of a polyphase AC power source and excited upon application of a voltage;
   a polyphase rectifying circuit for rectifying polyphase AC currents output from said plurality of reactors;
   a switching element for chopping positive and negative output currents from said rectifying circuit; and
   means for ON/OFF-controlling said switching element such that a current flowing in each phase of said polyphase AC power source is substantially proportional to a voltage of each phase.

9. A polyphase AC input to DC output voltage converter comprising:
   a plurality of chopper circuits each connected to a corresponding phase of a polyphase AC power source and formed of a plurality of reactors excited upon application of a voltage and a plurality of switching elements for chopping currents flowing in said plurality of reactors;

a plurality of secondary windings, each corresponding to one phase of said polyphase AC power source, wherein the secondary windings are star-connected to each other at a neutral point, and further, wherein said plurality of switching elements are connected between said plurality of reactors and the neutral point;

a polyphase rectifying circuit for rectifying polyphase AC currents output from said plurality of chopper circuits; and means for ON/OFF-controlling said plurality of switching elements such that a current flowing in each phase of said polyphase AC power source is substantially proportional to a voltage of each phase.

10. The voltage converter of claim 9, wherein said controlling means includes means for monitoring a current obtained by rectifying the current flowing in said polyphase AC power source, an output current from said rectifying circuit, and an output voltage from said rectifying circuit to control an ON/OFF timing of said switching element.

11. The voltage converter of claim 9, further comprising:
two capacitors connected in series between positive and negative output terminals of said rectifying circuit and having a common connection point connected to the neutral point; and
two loads connected in series between said positive and said negative output terminals of said rectifying circuit and having a common connection point connected to the neutral point.

12. The voltage converter of claim 9, further comprising:
two capacitors connected in series between positive and negative output terminals of said rectifying circuit and having a common connection point connected to the neutral point; and
a load connected between said positive and said negative output terminals of said rectifying circuit.

13. A polyphase AC input to DC output voltage converter comprising:
a plurality of chopper circuits each connected to a corresponding phase of a polyphase AC power source and formed of a plurality of reactors excited upon application of a voltage and a plurality of switching elements for chopping currents flowing in said plurality of reactors, wherein said plurality of switching elements are connected between two of the plurality of reactors;
a plurality of secondary windings, each corresponding to one phase of said polyphase AC power source, wherein the secondary windings are delta-connected to each other;
a polyphase rectifying circuit for rectifying polyphase AC currents output from said plurality of chopper circuits;
a capacitor connected between positive and negative output terminals of said rectifying circuit;
a load connected between said positive and said negative output terminals of said rectifying circuit; and
means for ON/OFF-controlling said plurality of switching elements such that a current flowing in each phase of said polyphase AC power source is substantially proportional to a voltage of each phase.

14. A polyphase AC input to DC output voltage converter comprising:
a polyphase rectifying circuit for rectifying a polyphase current output from a polyphase AC power source;
a chopper connected to an output of said rectifying circuit and formed of a reactor excited upon application of a voltage and a switching element for chopping a current flowing in said reactor; and
means for controlling ON/OFF of said switching element such that a current flowing in each phase of said polyphase AC power source is substantially proportional to a voltage of each phase.

15. A polyphase AC input to DC output voltage converter comprising:
a plurality of chopper circuits each connected to a corresponding phase of a polyphase AC power source and formed of a plurality of reactors excited upon application of a voltage and a plurality of switching elements for chopping currents flowing in said plurality of reactors;
a plurality of secondary windings, each corresponding to one phase of said polyphase AC power source, wherein the secondary windings are star-connected to each other at a neutral point, and further, wherein said plurality of switching elements are connected between said plurality of reactors and the neutral point;
a polyphase rectifying circuit for rectifying polyphase AC currents output from said plurality of chopper circuits; and
means for ON/OFF-controlling said plurality of switching elements such that a current flowing in each phase of said polyphase AC power source is substantially proportional to a voltage of each phase.

16. The voltage converter of claim 15, wherein said controlling means has means for monitoring the current flowing in each phase of said polyphase AC power source, the voltage of each phase, and an output voltage of the apparatus to control an ON/OFF timing of said switching element.

17. The voltage converter of claim 15, further comprising:
two capacitors connected in series between positive and negative output terminals of said rectifying circuit and having a common connection point connected to the neutral point; and
two loads connected in series between said positive and said negative output terminals of said rectifying circuit and having a common connection point connected to the neutral point.

18. The voltage converter of claim 15, further comprising:
two capacitors connected in series between positive and negative output terminals of said rectifying circuit and having a common connection point connected to the neutral point; and
a load connected between said positive and said negative output terminals of said rectifying circuit.

19. A polyphase AC input to DC output voltage converter comprising:
a plurality of chopper circuits each connected to a corresponding phase of a polyphase AC power source and formed of a plurality of reactors excited upon application of a voltage and a plurality of switching elements for chopping currents flowing in said plurality of reactors, wherein said plurality of switching elements are connected between two of the plurality of reactors;

a plurality of secondary windings, each corresponding to one phase of said polyphase AC power source, wherein the secondary windings are delta-connected to each other;

a polyphase rectifying circuit for rectifying polyphase AC currents output from said plurality of chopper circuits;

a capacitor connected between positive and negative output terminals of said rectifying circuit;

a load connected between said positive and said negative output terminals of said rectifying circuit; and means for ON/OFF-controlling said plurality of switching elements such that a current flowing in each phase of said polyphase AC power source is substantially proportional to a voltage of each phase.

* * * * *